United States Patent
Tokuda et al.

(10) Patent No.: US 9,323,387 B2
(45) Date of Patent: Apr. 26, 2016

(54) DISPLAY DEVICE, POSITION CORRECTION METHOD, AND PROGRAM

(71) Applicant: Sony Corporation, Tokyo (JP)

(72) Inventors: Takahiro Tokuda, Tokyo (JP); Masayuki Kuwata, Tokyo (JP); Ryoko Amano, Tokyo (JP); Akira Wakatsuki, Tokyo (JP)

(73) Assignee: Sony Corporation, Tokyo (JP)

( * ) Notice: Subject to any disclaimer, the term of this patent is extended or adjusted under 35 U.S.C. 154(b) by 121 days.

(21) Appl. No.: 14/086,438

(22) Filed: Nov. 21, 2013

(65) Prior Publication Data

US 2014/0078114 A1     Mar. 20, 2014

Related U.S. Application Data

(63) Continuation of application No. 13/275,526, filed on Oct. 18, 2011, now Pat. No. 8,614,696.

(30) Foreign Application Priority Data

Nov. 2, 2010     (JP) ............................... P2010-246738

(51) Int. Cl.
   *G06F 3/041*     (2006.01)
   *G06F 3/03*     (2006.01)

(52) U.S. Cl.
   CPC ............ *G06F 3/0418* (2013.01); *G06F 3/0304* (2013.01); *G06F 2203/04101* (2013.01); *G06F 2203/04104* (2013.01); *G06F 2203/04108* (2013.01)

(58) Field of Classification Search
   CPC combination set(s) only.
   See application file for complete search history.

(56) References Cited

U.S. PATENT DOCUMENTS

2011/0102469 A1     5/2011     Kami et al.

FOREIGN PATENT DOCUMENTS

| JP | 10-171588 A | 6/1998 |
|---|---|---|
| JP | 2003-085590 A | 3/2003 |
| JP | 2010-055510 A | 3/2010 |
| JP | 2010-108255 A | 5/2010 |
| JP | 2010-146386 A | 7/2010 |

OTHER PUBLICATIONS

Japanese Office Action issued on Jun. 2, 2015 in patent application No. 2014-038674.

*Primary Examiner* — Van Chow
(74) *Attorney, Agent, or Firm* — Sony Corporation

(57) ABSTRACT

A display device includes an operating body detection unit detecting an operating body disposed over a display screen, a position determination unit determining a three-dimensional position of the operating body from the detection result and outputting the three-dimensional position as position information for the operating body, a position designation unit designating a three-dimensional position over the display screen, a guide information generation unit generating guide information which requests a user to perform a predetermined action for an operating body around the designated three-dimensional position and then dispose the operating body at the designated three-dimensional position, a correction information generation unit generating correction information from an error between the designated three-dimensional position and a determination result of the three-dimensional position of the operating body disposed according to the guide information, and a position correction unit correcting a three-dimensional position of the operating body based on the correction information.

15 Claims, 18 Drawing Sheets

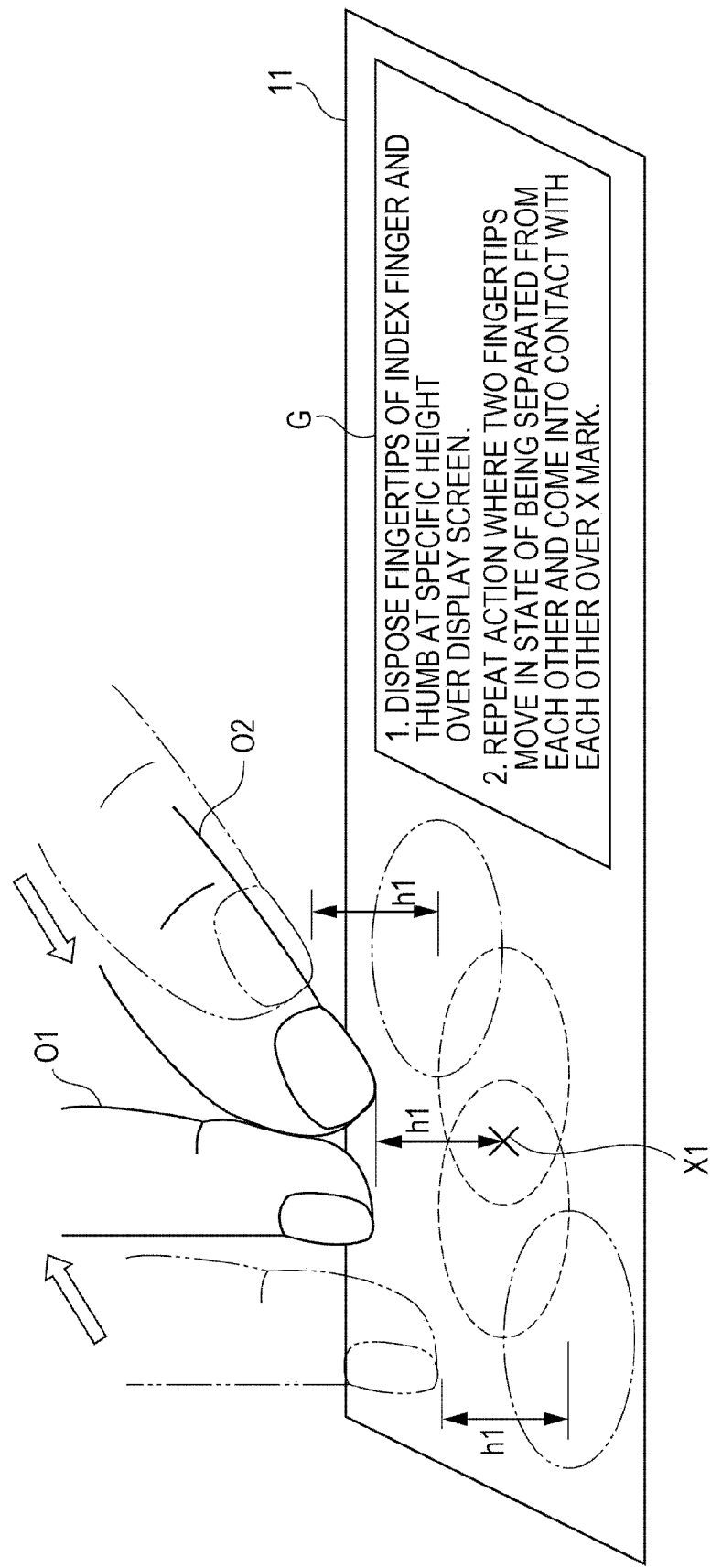

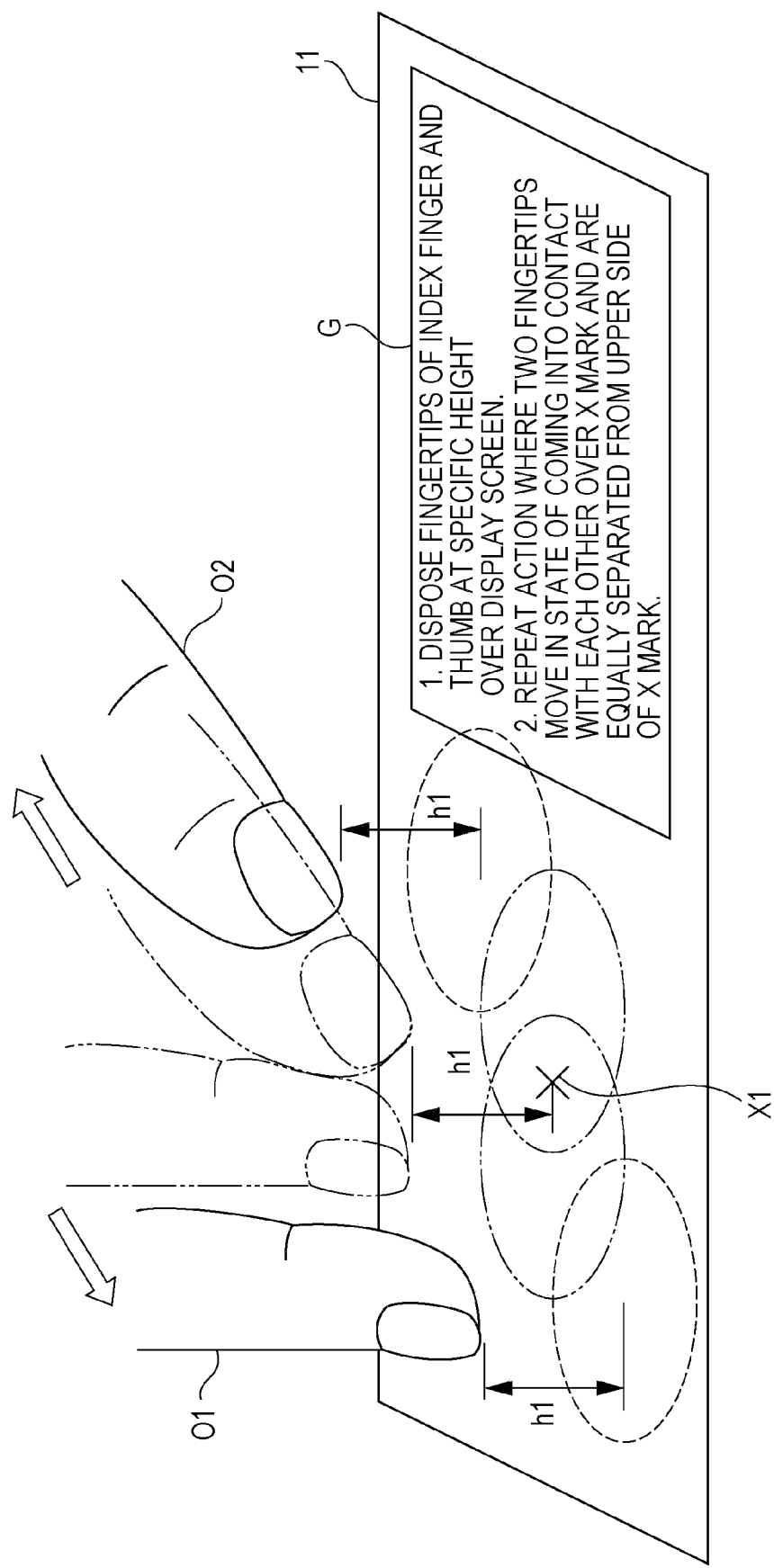

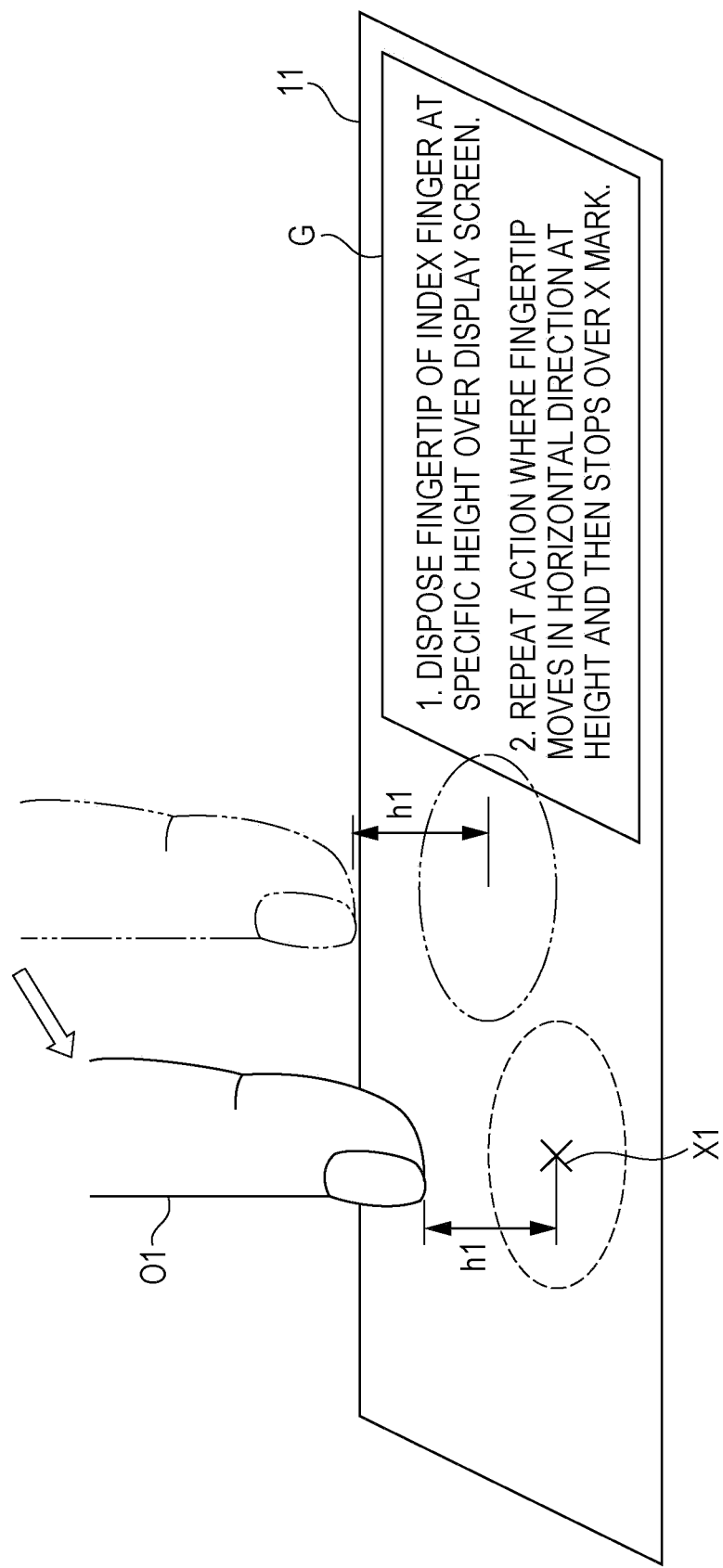

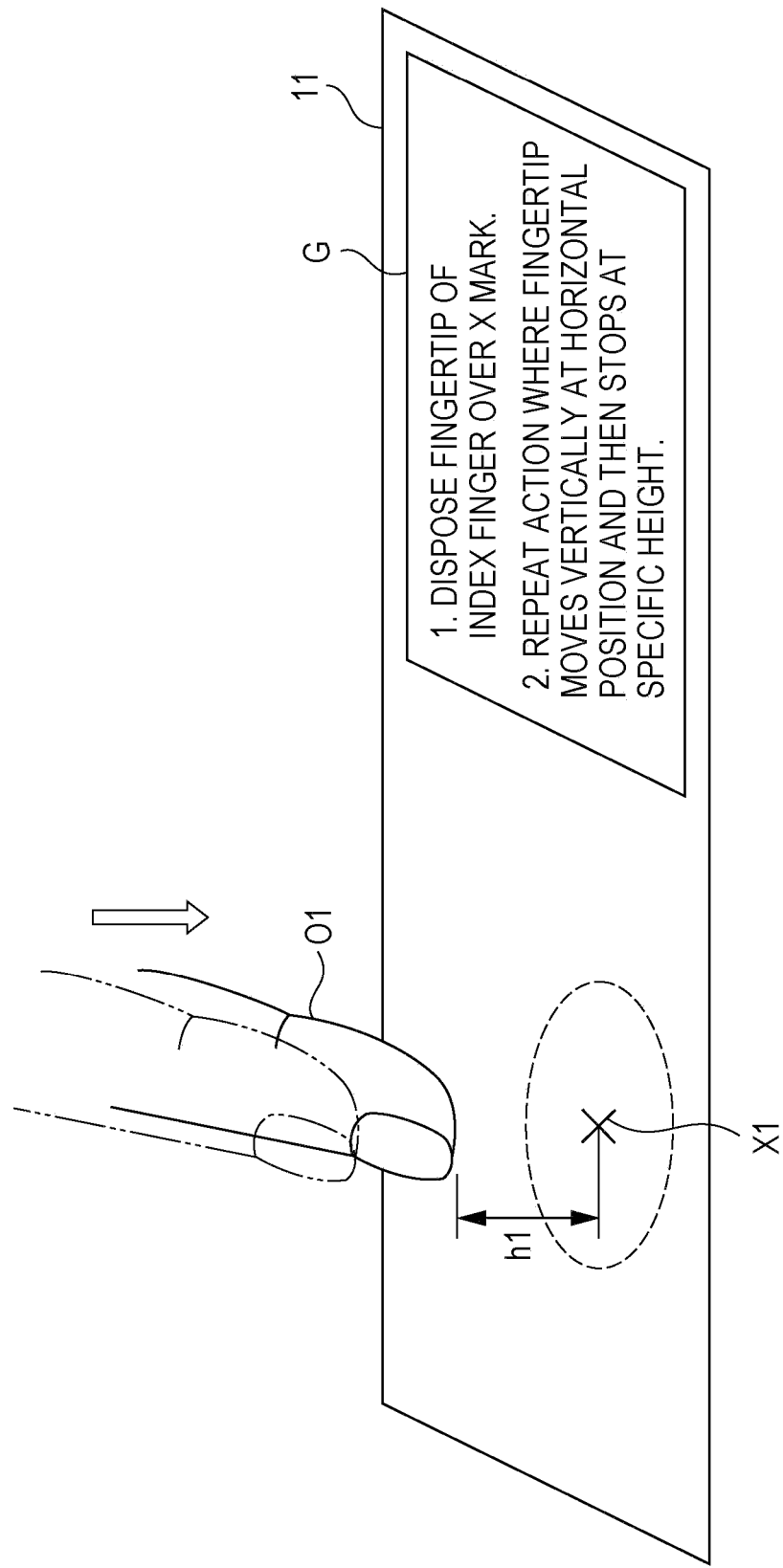

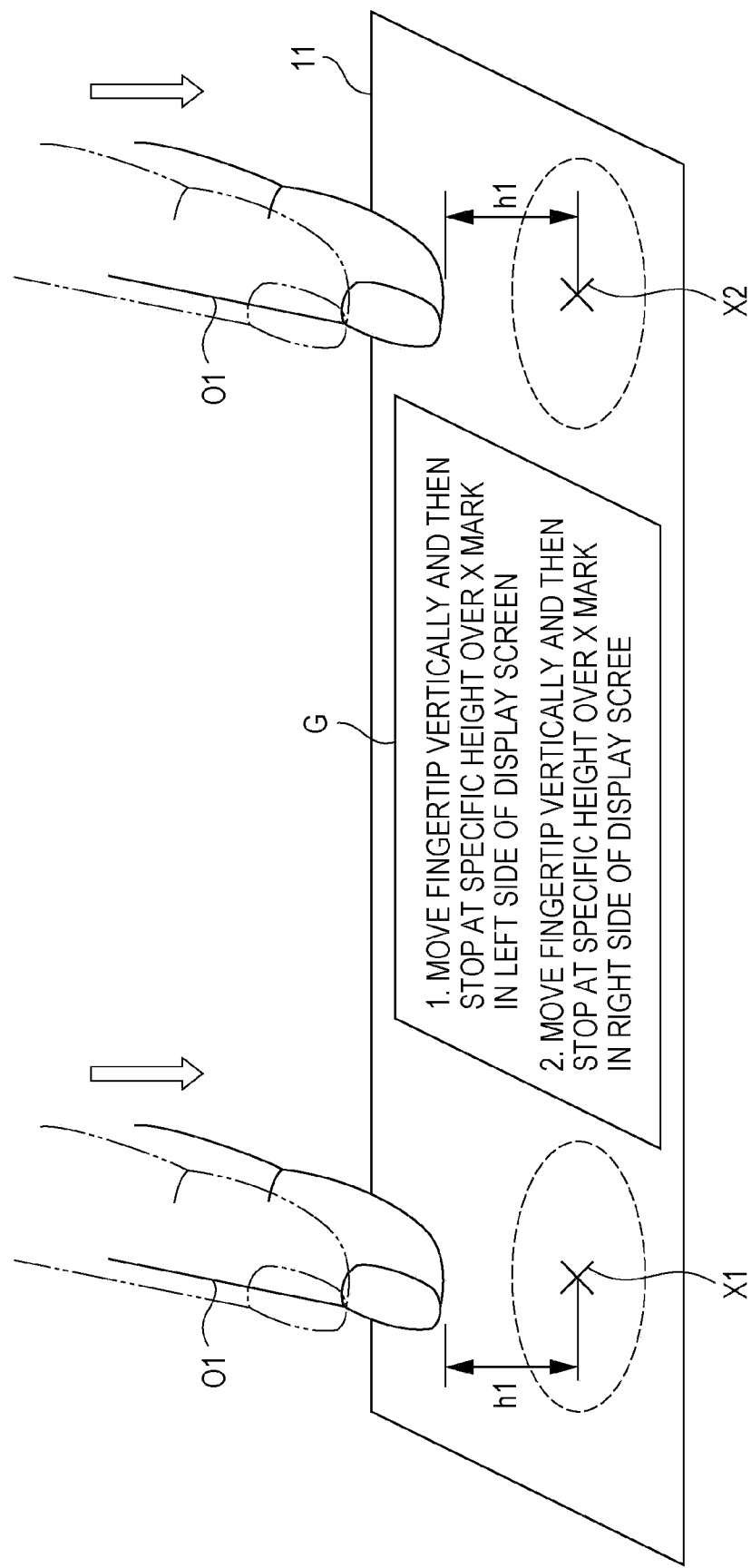

DISPLAY DEVICE, POSITION CORRECTION METHOD, AND PROGRAM

CROSS-REFERENCE TO RELATED APPLICATION

The present application is a continuation of U.S. patent application Ser. No. 13/275,526, filed Oct. 18, 2011, which claims priority from Japanese Patent Application No. JP 2010-246738 filed in the Japanese Patent Office on Nov. 2, 2010, the entire contents of which are incorporated herein by reference.

BACKGROUND

The present disclosure relates to a display device, a position correction method, and a program.

In the related art, there are display devices such as touch type or proximity type touch panels. In the display device, a user performs an operation input by detecting one or more operating bodies which touch and/or approach a display screen and determining positions of the operating bodies. In addition, when a position of the operating body is determined, errors unique to the display device occur depending on sensitivity of a sensor, or errors unique to a user occur depending on an operation method or the like. Therefore, there are cases of correcting a position of the operating body detected on the display screen and/or over the display screen in order to improve accuracy of the operation input.

SUMMARY

Here, in relation to a touch operation where a two-dimensional position of an operating body on the display screen is determined, the position of the operating body detected on the display screen can be relatively easily corrected. However, in relation to a non-touch operation where a three-dimensional position of an operating body over the display screen is determined, it is difficult to appropriately give feedback for correcting the position of the operating body to the display device, and to easily correct the position of the operating body detected over the display screen.

It is desirable to provide a display device, a position correction method, and a program, capable of easily correcting a three-dimensional position of an operating body detected over a display screen.

According to an embodiment of the present disclosure, there is provided a display device including an operating body detection unit that detects an operating body disposed over a display screen via the display screen; a position determination unit that determines a three-dimensional position of the operating body from the detection result and outputs the three-dimensional position as position information for the operating body; a position designation unit that designates a three-dimensional position over the display screen; a guide information generation unit that generates guide information which requests a user to perform a predetermined action for an operating body around the designated three-dimensional position and then dispose the operating body at the designated three-dimensional position, so as to be displayed on the display screen; a correction information generation unit that generates correction information from an error between the designated three-dimensional position and a determination result of the three-dimensional position of the operating body disposed according to the guide information; and a position correction unit that corrects a three-dimensional position of the operating body based on the correction information.

The predetermined action may be an action where two fingertips come into contact with each other at designated horizontal positions from a state where the fingertips are separated from each other in a state where the two fingertips are maintained at designated vertical positions.

The predetermined action may be an action where two fingertips are separated from each other with respect to designated horizontal positions from a state where the fingertips come into contact with each other in a state where the two fingertips are maintained at designated vertical positions.

The predetermined action may be an action where an operating body is horizontally moved in a state where the operating body is maintained at a designated vertical position, and then is stopped at a designated horizontal position.

The predetermined action may be an action where an operating body is vertically moved in a state where the operating body is maintained at a designated horizontal position, and then is stopped at a designated vertical position.

The correction information generation unit may generate the correction information based on determination results of three-dimensional positions of the operating body which is disposed at the designated three-dimensional position a plurality of times.

According to another embodiment of the present disclosure, there is provided a position correction method including detecting an operating body disposed over a display screen via the display screen; determining a three-dimensional position of the operating body from the detection result and outputting the three-dimensional position as position information for the operating body; designating a three-dimensional position over the display screen; generating guide information which requests a user to perform a predetermined action for an operating body around the designated three-dimensional position and then dispose the operating body at the designated three-dimensional position, so as to be displayed on the display screen; generating correction information from an error between the designated three-dimensional position and a determination result of the three-dimensional position of the operating body disposed according to the guide information; and correcting a three-dimensional position of the operating body based on the correction information.

According to still another embodiment of the present disclosure, there is provided a program enabling a computer to execute the position correction method. Here, the program may be provided using computer readable recording media, or may be provided via communication devices.

It is possible to provide a display device, a position correction method, and a program, capable of easily correcting a three-dimensional position of an operating body detected over a display screen.

BRIEF DESCRIPTION OF THE DRAWINGS

FIG. 7 is a diagram illustrating an example of the guide information which requests a user to perform an action where the fingertips come into contact with each other.

FIG. 13A is a diagram (1/2) illustrating an example of the correction information obtained based on an action where the fingertips are separated from each other.

FIG. 14A is a diagram (1/2) illustrating an example of the correction information obtained based on a horizontal movement action and a stop action of an operating body.

FIG. 15A is a diagram (1/2) illustrating an example of the correction information obtained based on a vertical movement action and a stop action of an operating body.

FIG. 16A is a diagram (1/2) illustrating an example of the correction information obtained based on an action where an operating body is vertically moved and stopped at a plurality of positions on the display screen.

DETAILED DESCRIPTION OF EMBODIMENTS

Figure 1:
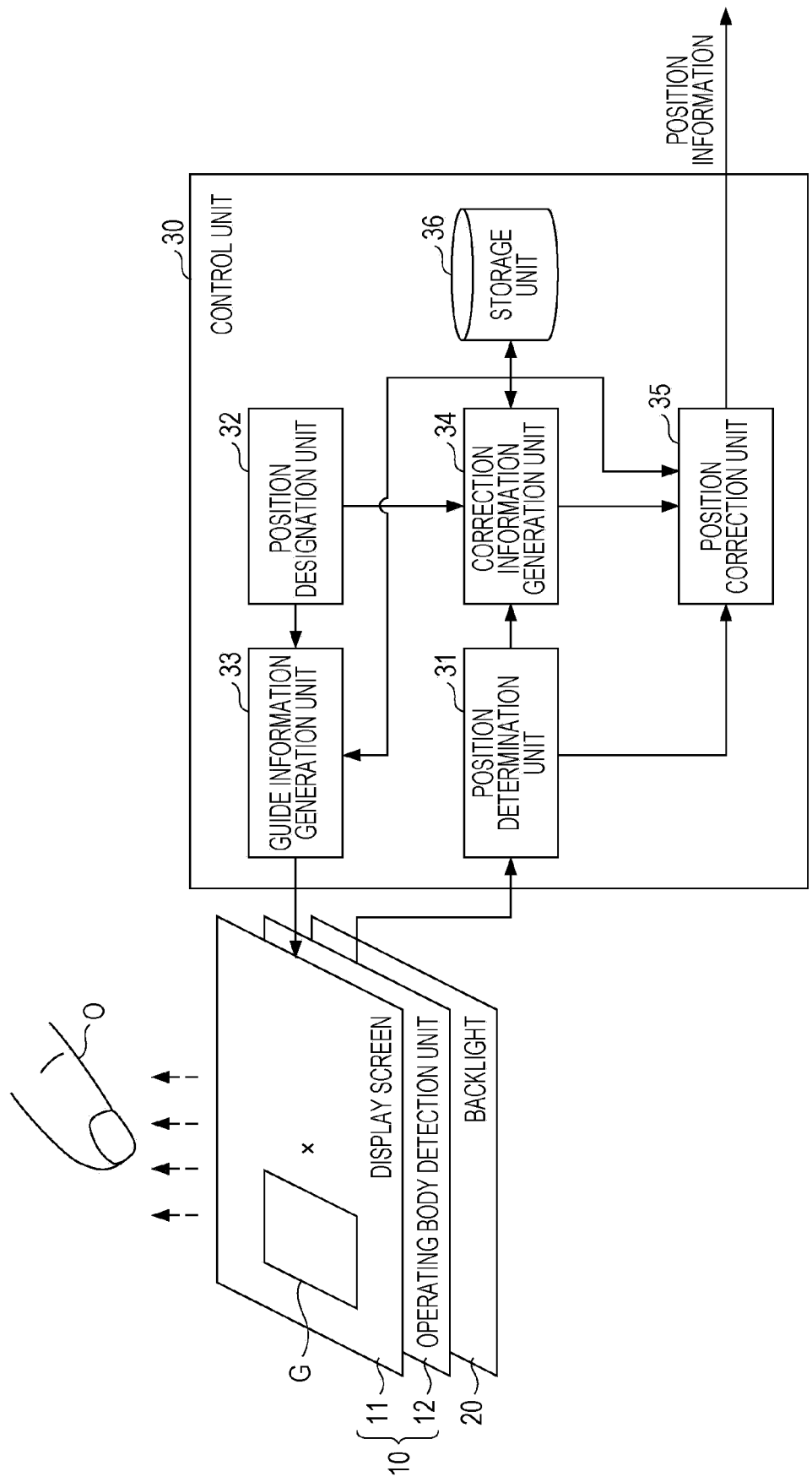
FIG. 1 is a block diagram illustrating a configuration of a display device according to an embodiment of the present disclosure.

Hereinafter, exemplary embodiments of the present disclosure will be described with reference to the accompanying drawings. In addition, in the present specification and the drawings, constituent elements which have substantially the same functional configurations are given the same reference numerals, and repeated description thereof will be omitted.

1. Configuration of Display Device

First, a configuration of a display device according to an embodiment of the present disclosure will be described with reference to FIGS. 1 to 5C. The display device detects positions of one or more operating bodies O close to a display screen 11, such as fingers of a user or a stylus. The display device is used for mobile phones, portable information terminals, personal computers, televisions, digital cameras, music players, videogame players, household electrical appliances, and the like.

Figure 2:
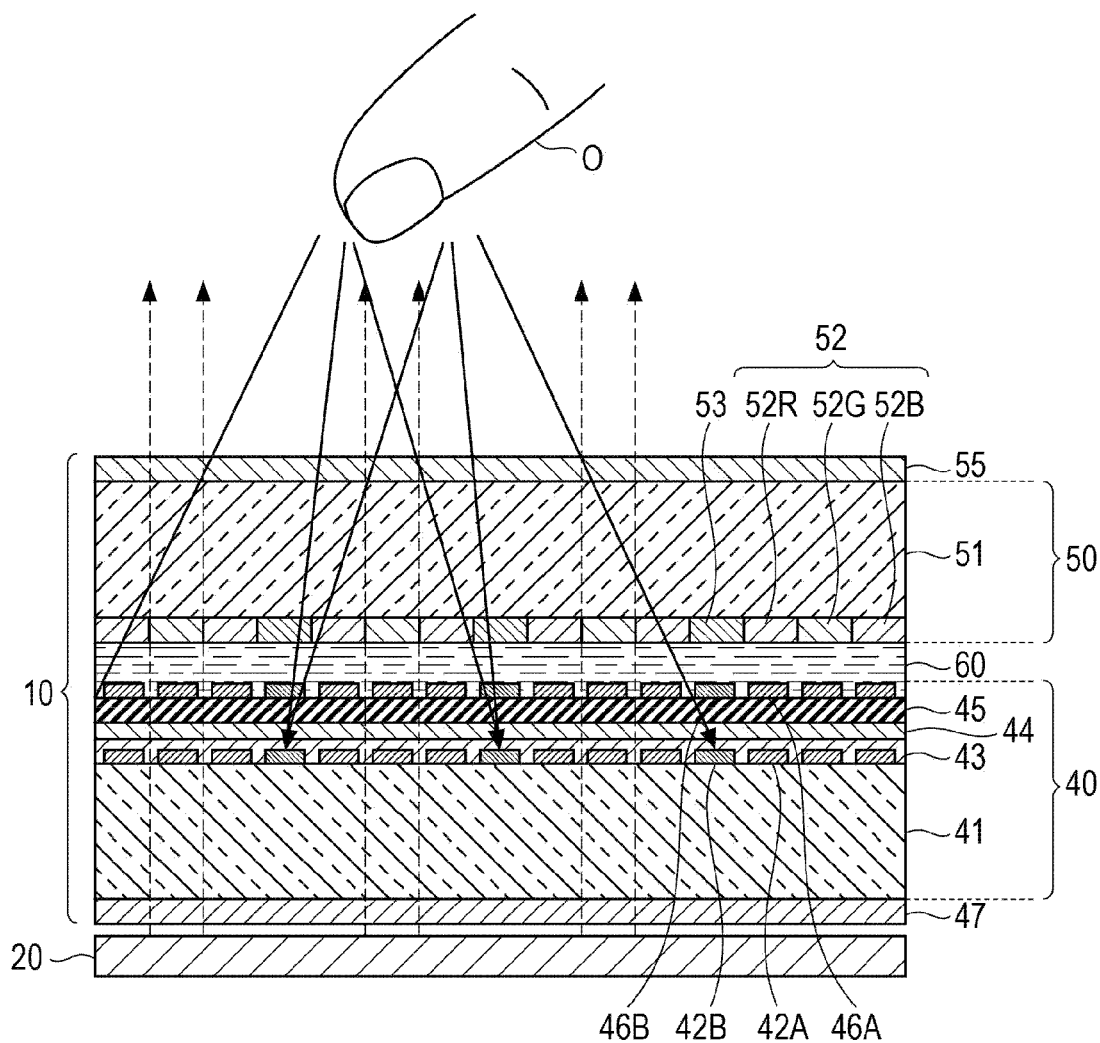
FIG. 2 is a diagram illustrating a configuration of the periphery of an operating body detection unit provided in the display device shown in FIG. 1.
Figure 3:
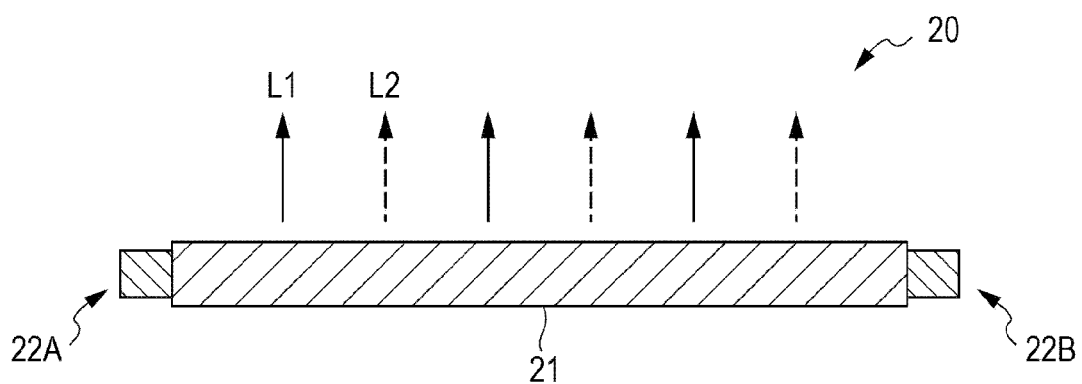
FIG. 3 is a diagram illustrating a cross section of the backlight shown in FIG. 1.

FIG. 1 is a block diagram illustrating a configuration of the display device according to an embodiment of the present disclosure. FIG. 2 shows a configuration of the periphery of an operating body detection unit 12 provided in the display device shown in FIG. 1. FIG. 3 shows a cross section of the backlight 20 shown in FIG. 1.

As shown in FIG. 1, the display device according to the embodiment of the present disclosure includes a display panel 10, a backlight 20, and a control unit 30.

The display panel 10 is provided with a display screen 11 where display pixels such as liquid crystal elements are arranged on a substrate in a matrix. The display panel 10 has an operating body detection unit 12 which detects the operating body O disposed over the display screen 11 and supplies a detection result to a position determination unit described later. The operating body detection unit 12 includes photosensors 42B (refer to FIG. 2) disposed so as to correspond to the display pixels. The backlight 20 is a light source which is disposed at the rear surface of the display panel 10 and illuminates the front surface and the upper side of the display screen 11 via the display panel 10. In addition, details of the display panel 10 and the backlight 20 will be described later.

The control unit 30 includes a position determination unit 31, a position designation unit 32, a guide information generation unit 33, a correction information generation unit 34, a position correction unit 35, and a storage unit 36. The control unit 30 is selectively operated between a correction information generation mode and a normal operation mode.

The correction information generation mode is a mode in which correction information used to correct a determination result of a three-dimensional position of the operating body O is generated. The normal operation mode is a mode in which correction information is not generated, and a predetermined process is performed according to a three-dimensional position of the operating body O.

The position determination unit 31 determines a three-dimensional position of the operating body O from the detection result of the operating body detection unit 12, and outputs the three-dimensional position as position information of the operating body O. The position determination unit 31 determines a three-dimensional position of the operating body O disposed at an arbitrary position over the display screen 11 and supplies the three-dimensional position to the position correction unit 35, in order to perform a predetermined operation in the normal operation mode. The position determination unit 31 determines a three-dimensional position of the operating body O disposed according to guide information G described later, and supplies the three-dimensional position to the correction information generation unit 34, in the correction information generation mode.

In the correction information generation mode, the position designation unit 32 designates a three-dimensional position over the display screen 11, and supplies the designated three-dimensional position to the guide information generation unit 33 and the correction information generation unit 34.

The three-dimensional position over the display screen 11 is designated by a horizontal position and a vertical position on the display screen 11.

The guide information generation unit 33 generates guide information G and supplies the generated guide information G to the display panel 10 in the correction information generation mode. The guide information G is information which requests a user to perform a predetermined action for the operating body O around the designated three-dimensional position and then to dispose the operating body O at the designated three-dimensional position. Here, a specified horizontal position is indicated using marks, icons, or the like displayed on the display screen 11. A specified vertical position is indicated using a height at which the operating body O is typically disposed during user operation.

The correction information generation unit 34 generates correction information and supplies the generated correction information to the storage unit 36 in the correction information generation mode. The correction information is generated so as to cancel out an error between the designated three-dimensional position and a determination result of the three-dimensional position of the operating body O disposed according to the guide information G, that is, an error in a horizontal position and/or a vertical position on the display screen 11.

The position correction unit 35 corrects a three-dimensional position of the operating body O based on correction information in a case where the correction information is generated in the normal operation mode. The position correction unit 35 supplies the corrected three-dimensional position to a processing unit (not shown) or the like as position information for the operating body O.

The storage unit 36 stores guide information G or correction information. The storage unit 36 is accessed by at least the guide information generation unit 33, the correction information generation unit 34, and the position correction unit 35.

In addition, in the embodiment, a case where the position correction unit 35 is provided at the rear stage of the position determination unit 31 is assumed, but the position correction unit 35 may be integrated with the position determination unit 31. In this case, the position determination unit 31 determines a three-dimensional position of the operating body O using correction information together with a detection result of the operating body O, and outputs the three-dimensional position as position information for the operating body O, in the normal operation mode.

The control unit 30 is constituted by hardware and/or software. The control unit 30 includes a CPU, a ROM, a RAM, and the like, and the CPU develops a program read from the ROM on the RAM for execution, thereby realizing the position correction method according to the embodiment of the present disclosure.

As shown in FIG. 2, the display device has the display panel 10 including a TFT (thin film transistor) substrate 40, a CF (color filter) substrate 50, and the backlight 20 disposed at the rear surface of the display panel 10. The TFT substrate 40 is provided with a plurality of TFTs 42A and a plurality of photosensors 42B (hereinafter, also referred to as sensors 42B) with predetermined pitches on a substrate 41 made of glass. The TFTs 42A are connected to pixel electrodes 46A, and drive a plurality of display pixels (pixel electrodes 46A) by an active matrix method or the like. The sensors 42B are light detection elements which can detect light applied to a PN junction of a semiconductor as a current or a voltage, and are provided under non-visible light transmission black portions 53 described later. The sensors 42B are, for example, PIN photodiodes, PDN (P-Doped N), or the like using a silicon semiconductor.

The TFTs 42A and the sensors 42B may be formed through, for example, the same thin film process on the same layer on the substrate 41. In addition, details of the TFTs 42A and the sensors 42B will be described later.

A planarized layer 43 for planarizing unevenness of the TFTs 42A and the sensors 42B is formed on the substrate 41. A common electrode 44 and a plurality of pixel electrodes 46A are formed so as to be opposite to each other via an insulating film 45 on the planarized layer 43. Among them, the common electrode 44 is provided as an electrode common to the respective display pixels, and the pixel electrodes 46A are separated and provided for the respective display pixels.

Black display electrodes 46B are provided in regions corresponding to the non-visible light transmission black portions 53 described later on the same layer as the pixel electrodes 46A. The black display electrodes 46B block visible light which is incident to a liquid crystal layer 60 by a driving element (not shown), and are provided to be opposite to the common electrode 44, in order to perform normal black display. That is to say, the liquid crystal layer 60 is applied with a constant voltage for the black display. In addition, as described above, the black display electrodes 46B may be provided such that a voltage for black display is applied; however, a voltage may be applied using the common electrode 44 without providing the black display electrodes 46B.

The CF substrate 50 is provided with color filter layers 52 and the non-visible light transmission black portions 53 which are periodically arranged on a substrate 51 made of glass. The color filter layers 52 include, for example, a red color filter layer 52R, a green color filter layer 52G, and a blue color filter layer 52B, and the three color filter layers 52 are provided so as to correspond to the respective display pixels (the pixel electrodes 46A). The non-visible light transmission black portions 53 function as black matrices for blocking light, and are provided in order to improve display contrast. However, in the embodiment, the non-visible light transmission black portion 53 is configured to block visible light and transmit non-visible light, and is made of, for example, the same material as the non-visible light transmission black portions 53 described later.

Two polarizing plates 47 and 55 are disposed in a crossed Nichole prism state. The polarizing plate 47 is a polarizer which selectively transmits a specific polarization component of visible light incident from the backlight 20 side so as to be incident to the liquid crystal layer 60. The polarizing plate 55 is an analyzer which transmits a polarization component perpendicular to the light passing through the polarizing plate 47 such that display light is emitted upwardly.

The liquid crystal layer 60 is formed between the TFT substrate 40 and the CF substrate 50 so as to modulate light passing therethrough depending on an electric field state. In addition, alignment layers (not shown) are respectively formed between the liquid crystal layer 60 and the TFT substrate 40, and between the liquid crystal layer 60 and the CF substrate 50.

The backlight 20 functions as a light source which illuminates the display panel 10, and is disposed such that the emitting surface thereof is opposite to the entire surface of the display screen 11. The backlight 20 emits non-visible light L1 along with visible light L2 as shown in FIG. 3. In the backlight 20, for example, a non-visible light source 22A is provided at one end of a light guide plate 21 having a plate shape, and a visible light source 22B is provided at the other end thereof. Light emitting diodes or the like are used as the non-visible light source 22A and the visible light source 22B. With this configuration, the non-visible light L1 emitted from the non-visible light source 22A and the visible light L2 emitted from the visible light source 22B propagate through the light guide plate 21, and are drawn from one surface of the TFT substrate 40.

The non-visible light L1 is light other than the visible light L2, that is, ultraviolet light, infrared light, and the like in wavelength ranges other than a wavelength range (for example, 380 nm to 780 nm) which is visible to the human eye. The ultraviolet light may use light in a near-ultraviolet range (300 nm to 380 nm), and the infrared light may use light in a near-infrared range (780 nm to 1100 nm) which is appropriate for the sensitivity of a Si photodiode. However, the polarizing plates 47 and 55 provided at both the surfaces of the display panel 10 have a polarization characteristic in the visible range and near-ultraviolet range. Therefore, the transmittance is reduced such that a detected light amount becomes small, and thus the above ranges depend on image light modulated depending on a pixel potential. On the other hand, since the near-infrared region does not have the polarization characteristic, reduction in a detected light amount is suppressed, and thus the region does not depend on image light. For this reason, in a case of using a liquid crystal element where the polarizing plates 47 and 55 are necessary as in the embodiment, near-infrared light is preferably used as the non-visible light L1.

In the display device, when a driving voltage which is equal to or more than a predetermined threshold value is supplied between the common electrode 44 and the pixel electrodes 46A, a liquid crystal state is modulated by a predetermined electric field which is applied to the liquid crystal layer 60. Thereby, the visible light L2 incident to the liquid crystal layer 60 from the backlight 20 side via the polarizing plate 47 is modulated for each display pixel, passes through the corresponding color filter layers 52, and is emitted to the upper side of the polarizing plate 55 as three color display light. In this way, an image is displayed on the display screen 11. In addition, light incident to the non-visible light transmission black portions 53 emitted from the backlight 20 is blocked by the non-visible light transmission black portions 53, and thus it is difficult for the display light to have an adverse effect on optical characteristics.

The visible light L2 from the backlight 20 displays an image on the display screen 11, whereas the non-visible light L1 from the backlight 20 passes through the polarizing plate 47, the TFT substrate 40, the liquid crystal layer 60, and the CF substrate 50, and the polarizing plate 55. In addition, the non-visible light L1 passes through the liquid crystal layer 60, the color filter layers 52, and the non-visible light transmission black portions 53 without being blocked.

Here, if the finger O (an example of the operating body O) is disposed over the display screen 11, the non-visible light L1 emitted to the upper side of the polarizing plate 55 is diffused and reflected by the surface of the finger O. The reflected light is received by the sensors 42B, and thereby distribution information for light intensity of the finger O is obtained. The position determination unit 31 receives the distribution information for light intensity and calculates central coordinates of the finger O, thereby determining a position of the finger O.

Figure 4A:
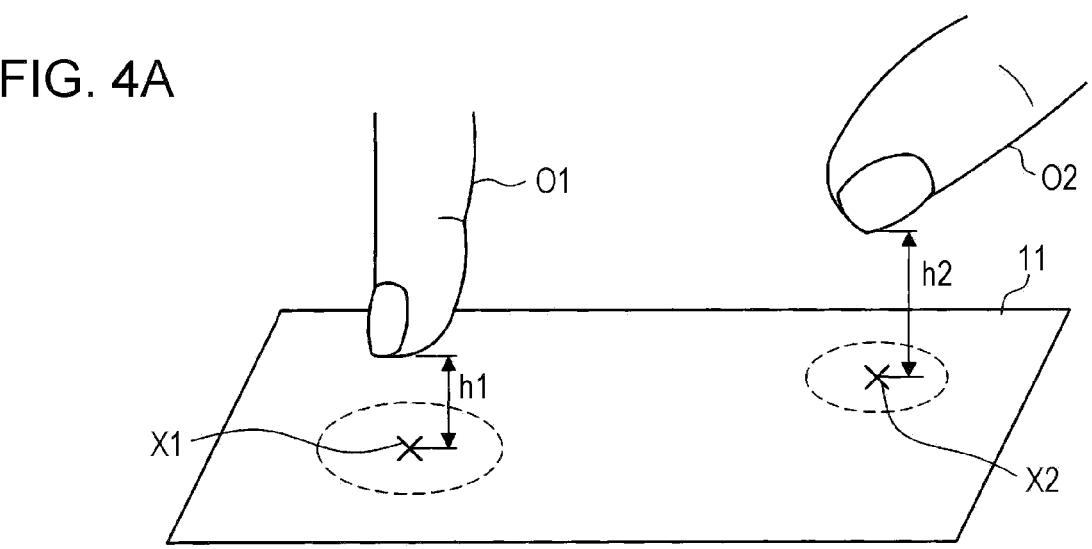
FIG. 4A is a diagram (1/3) illustrating an example of the position determination of an operating body.
Figure 4B:
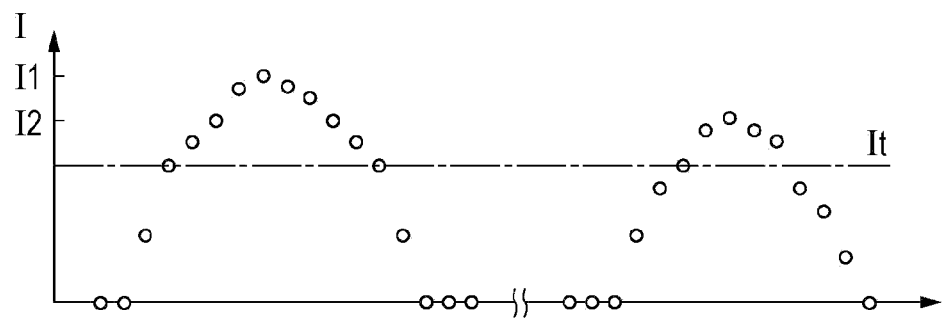
FIG. 4B is a diagram (2/3) illustrating an example of the position determination of the operating body.
Figure 4C:
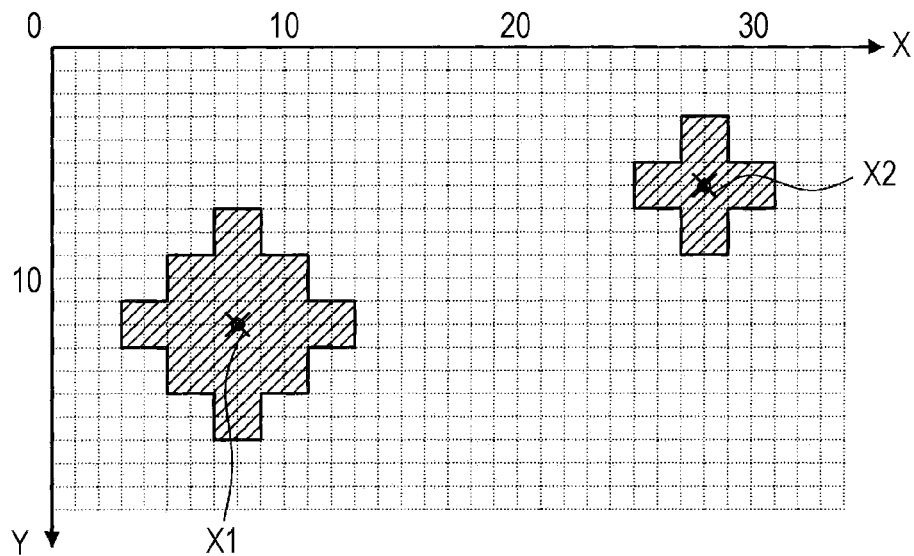
FIG. 4C is a diagram (3/3) illustrating an example of the position determination of the operating body.

FIGS. 4A to 4C show an example of the position determination of the operating body O. In the example shown in FIG. 4A, as an example of the operating bodies O, the fingertip O1 (the first fingertip O1) of the index finger and the fingertip O2 (the second fingertip O2) of the thumb are disposed over the display screen 11. The first fingertip O1 is disposed such that the center thereof is located at the height h1 over the X mark X1 displayed on the display screen 11, and the second fingertip O2 is disposed such that the center thereof is located at the height h2 (>the height h1) over the X mark X2. The height h1 is set to a height at which the centers of the fingertips O1 and O2 are typically disposed during user operation.

The operating body detection unit 12 detects light which is emitted from the backlight 20 and is reflected by the first and second fingertips O1 and O2. FIG. 4B shows a one-dimensional distribution of light intensity detected by the sensors 42B corresponding to positions of the first and second fingertips O1 and O2. In addition, the transverse axis in FIG. 4B is expressed with the arrangement interval units of the sensors 42B. As shown in FIG. 4B, the reflected light beams from the first and second fingertips O1 and O2 respectively indicate the maximum intensities I1 and I2 at the centers closest to the display screen 11, and indicate reduction in the intensity at the periphery thereof.

In addition, since the first fingertip O1 is closer to the display screen 11 than the second fingertip O2, the maximum intensity I1 of the reflected light from the first fingertip O1 is greater than the maximum intensity I2 of the reflected light from the second fingertip O2. Here, the maximum intensities I1 and I2 respectively correspond to intensities of the reflected light from the operating bodies O disposed at the heights h1 and h2 over the display screen 11. Therefore, if a uniform detection threshold value It is set in the display screen 11, the reflected light from the first fingertip O1 is detected in a wider region than the reflected light from the second fingertip O2.

In addition, the position determination unit 31 determines positions of the first and second fingertips O1 and O2. FIG. 4C shows a two-dimensional distribution of the sensors 42B which detect reflected light having the detection threshold value It or more. Further, the X axis and the Y axis in FIG. 4C are coordinates which express positions on the display screen 11 with the arrangement interval units of the sensors 42B, and an origin of the X axis and the Y axis is set to a predetermined position on the display screen 11. In addition, the shaded regions in FIG. 4C indicate two-dimensional distributions of the sensors 42B which detect reflected light having the detection threshold value It or more.

As shown in FIG. 4C, reflected light from the first fingertip O1 is detected by a plurality of sensors 42B disposed in a certain region on the display screen 11, and reflected light from the second fingertip O2 is detected by a plurality of sensors 42B disposed in the top right region with respect to the certain region. In addition, the first fingertip O1 is closer to the display screen 11 than the second fingertip O2, and thus a detection region of the reflected light from the first fingertip O1 (also referred to as a detection region of the first fingertip O1) is wider than a detection region of the reflected light from the second fingertip O2 (also referred to as a detection region of the second fingertip O2).

In addition, the position determination unit 31 calculates a position of the first fingertip O1 as (X, Y, Z)=(8, 12, h1) from the center of the detection region of the first fingertip O1, and calculates a position of the second fingertip O2 as (X, Y, Z)=(28, 6, h2) from the center of the detection region of the second fingertip O2.

Figure 5A:
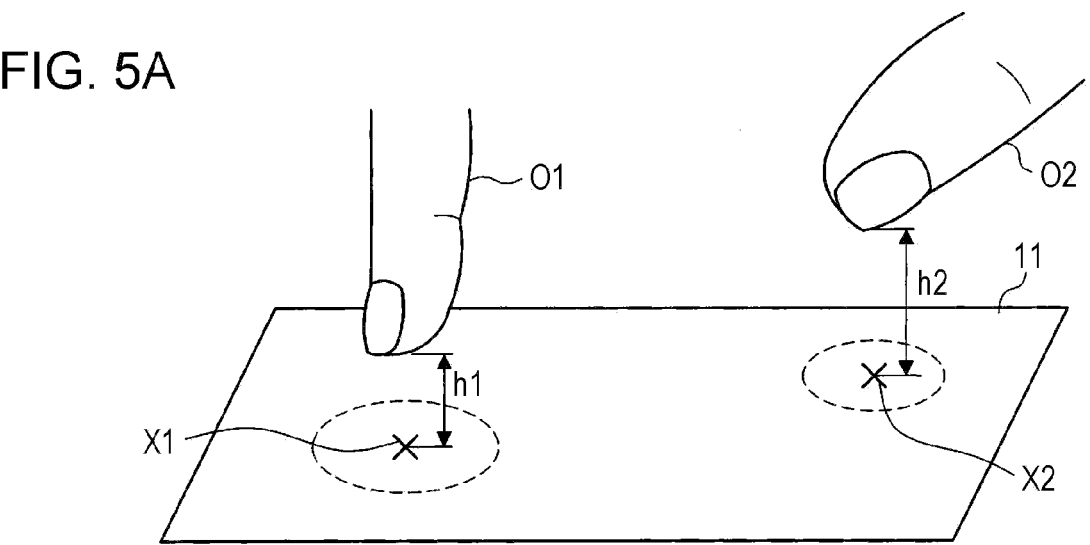
FIG. 5A is a diagram (1/3) illustrating an example of the error in the position determination of the operating body.
Figure 5B:
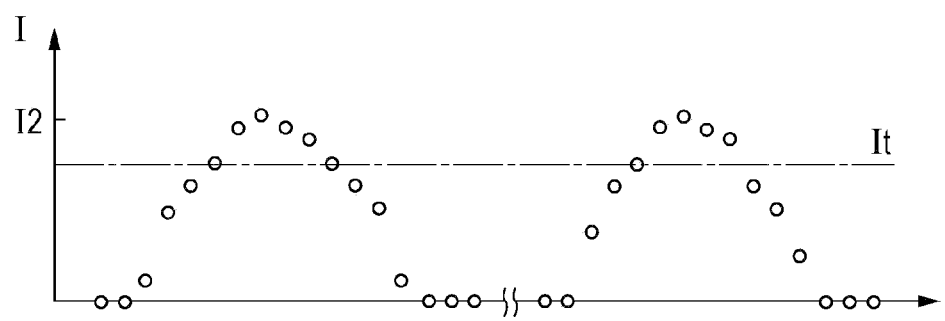
FIG. 5B is a diagram (2/3) illustrating an example of the error in the position determination of the operating body.
Figure 5C:
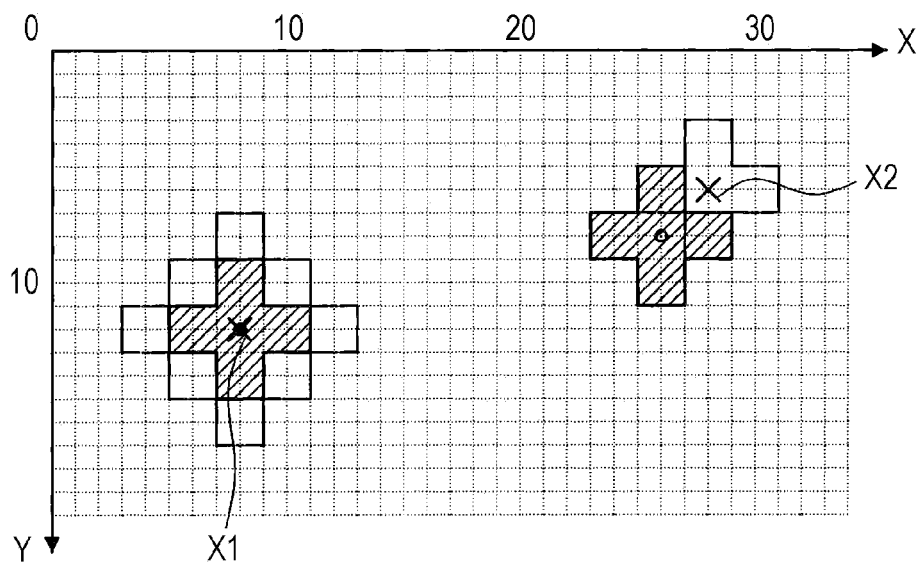
FIG. 5C is a diagram (3/3) illustrating an example of the error in the position determination of the operating body.

FIGS. 5A to 5C show an example of the error in the position determination of the operating bodies O. In the example shown in FIG. 5A, in the same manner as the case shown in FIG. 4A, the first and second fingertips O1 and O2 are disposed over the display screen 11. However, as shown in FIG. 5B, the reflected light from the first fingertip O1 is detected at the intensity (maximum intensity I2) smaller than that shown in FIG. 4B, and the reflected light from the second fingertip O2 is detected so as to be deviated to the lower left side from the case shown in FIG. 4C.

In this case, the position determination unit 31, as shown in FIG. 5C, calculates a position of the first fingertip O1 as (X, Y, Z)=(8, 12, h2) from the center of the detection region of the first fingertip O1, and calculates a position of the second fingertip O2 as (X, Y, Z)=(26, 8, h2) from the center of the detection region of the second fingertip O2. Therefore, the position of the first fingertip O1 is determined as being higher than the original position, and the position of the second fingertip O2 is determined as being the lower left position with respect to the original position. For this reason, errors occur when positions of the first and second fingertips O1 and O2 are determined. The errors occur as errors unique to the display device depending on the sensitivity of the sensors 42B, or as errors unique to a user depending on operation methods.

2. Operation of Display Device

Next, an operation of the display device according to the embodiment of the present disclosure will be described with reference to FIGS. 6 to 16B.

Figure 6:
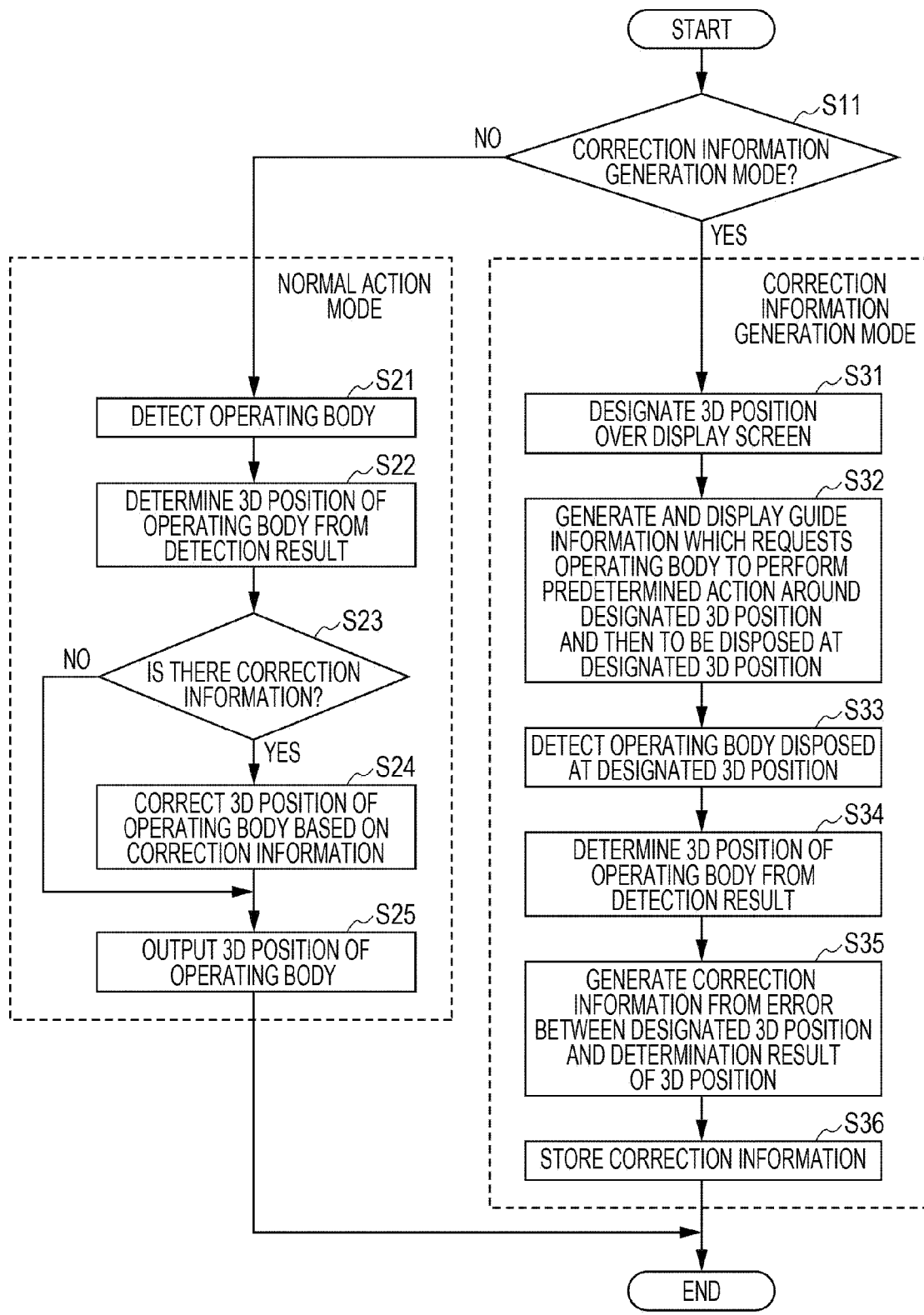
FIG. 6 is a flowchart illustrating operation procedures of the display device according to the embodiment of the present disclosure.

FIG. 6 is shows operation procedures according to the embodiment of the present disclosure. As shown in FIG. 6, the display device is operated in a correction information generation mode and a normal operation mode. The operation modes may be switched by a user through a predetermined operation, or the correction information generation mode may be set at a predetermined frequency from the display device (step S11). In the normal operation mode, the operating body detection unit 12 detects the operating body O disposed over the display screen 11 (step S21). The position determination unit 31 determines a three-dimensional position of the operating body O from a detection result (step S22), and if correction information is not generated (No in step S23), outputs the three-dimensional position as position information for the operating body O (step S25).

On the other hand, in the correction information generation mode, the position designation unit 32 designates a three-dimensional position over the display screen 11 (step S31). The guide information generation unit 33 generates guide information G so as to be displayed on the display screen 11 (step S32). The guide information G is information which requests a user to perform a predetermined action for the operating body O around the designated three-dimensional position, and then to dispose the operating body O at the designated three-dimensional position.

The operating body detection unit 12 detects the operating body O disposed at the designated three-dimensional position according to the guide information G (step S33). The position determination unit 31 determines a three-dimensional position of the operating body O from the detection result (step S34). The correction information generation unit 34 generates correction information from an error between the designated three-dimensional position and the three-dimensional position of the operating body O disposed according to the guide information G (step S35). The correction information is stored in the storage unit 36 (step S36).

In the normal operation mode, the position correction unit 35 corrects the three-dimensional position of the operating body O based on the correction information stored in the storage unit 36 (step S24), if the correction information is generated (Yes in step S23). The corrected three-dimensional position is output as position information for the operating body O (step S25). In addition, as described above, a three-dimensional position of the operating body O may be determined using a detection result of the operating body O, and correction information and may be output as position information for the operating body O.

FIG. 7 shows an example of the guide information G which requests a user to perform an action for bringing the fingertips O1 and O2 into contact with each other. The guide information G is displayed at an arbitrary position on the display screen 11 along with marks, icons, and the like designating a horizontal position on the display screen 11 in the correction information generation mode. The guide information G is information which requests a user to repeatedly perform an action where, for example, the fingertip O1 of the index finger (first fingertip O1) and the fingertip of the thumb (second fingertip O2) are disposed at a specific height on the display screen 11, are moved from a state where two fingertips O1 and O2 are separated from each other at the height, and then come into contact with each other over the X mark. In addition, the specific height over the display screen 11 corresponds to the height h1 at which the operating body O such as the fingertip is typically disposed during user operation.

As shown in FIG. 7, first, the user disposes the first fingertip O1 and the second fingertip O2 at the height h1 over the display screen 11 according to the guide information G. In addition, the user moves the first and second fingertips O1 and O2 from a state of separating the fingertips from each other in a state of maintaining the height, and accurately brings the fingertips into contact with each other over the X mark X1. The user repeats the action several times. Here, as described later, a case where the horizontal position (X, Y)=(10, 12) on the display screen 11 is designated by the X mark X1 is assumed.

Figure 8A:
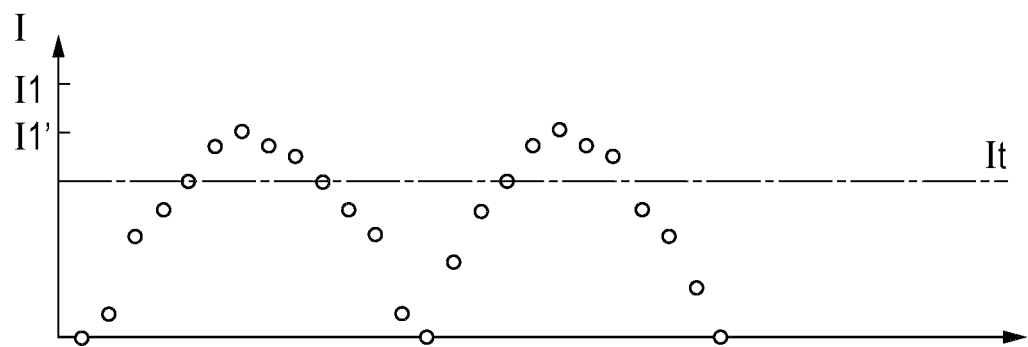
FIG. 8A is a diagram (1/2) illustrating an example of the position determination of an operating body in a state where the fingertips are separated from each other.
Figure 8B:
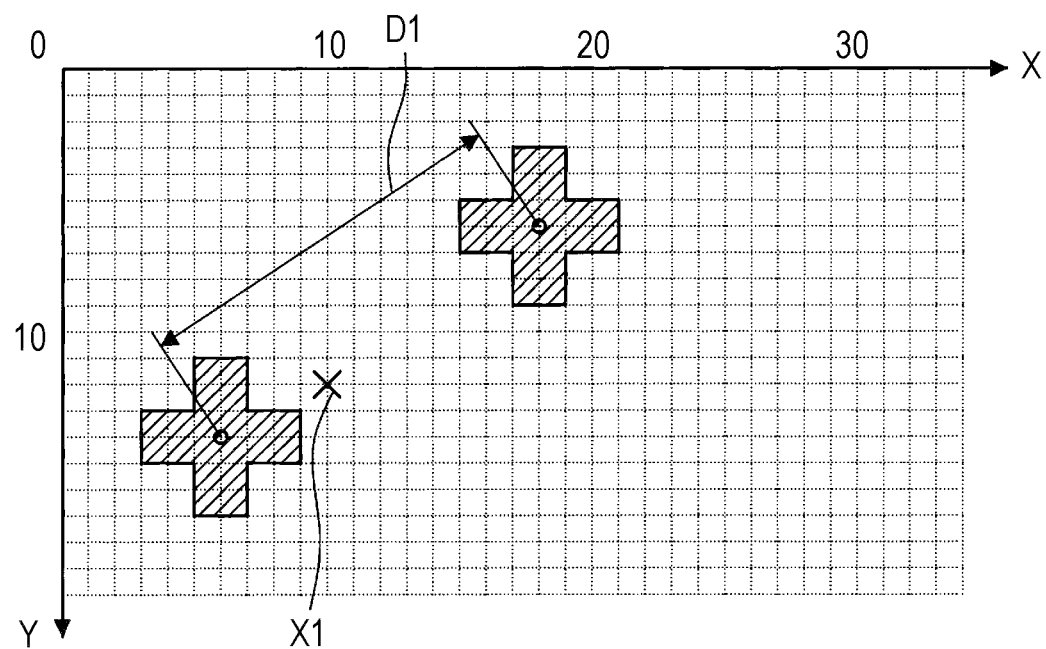
FIG. 8B is a diagram (2/2) illustrating an example of the position determination of an operating body in a state where the fingertips are separated from each other.
Figure 9A:
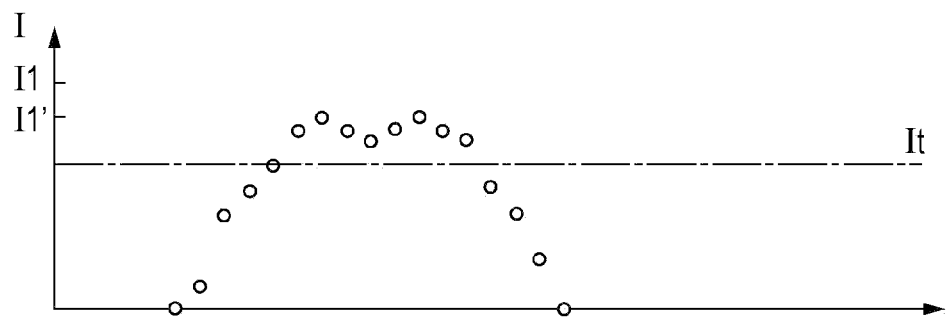
FIG. 9A is a diagram (1/2) illustrating an example of the position determination of an operating body in a state where the fingertips come into contact with each other.
Figure 9B:
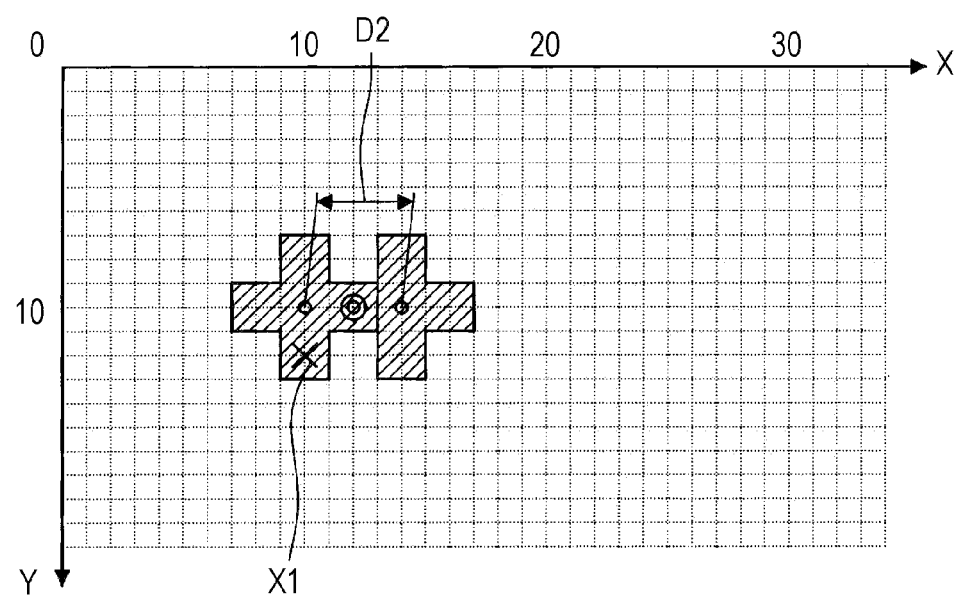
FIG. 9B is a diagram (2/2) illustrating an example of the position determination of an operating body in a state where the fingertips come into contact with each other.

FIGS. 8A and 8B show an example of the position determination of the operating bodies O in a state where the fingertips O1 and O2 are separated from each other. FIGS. 9A and 9B show an example of the position determination of the operating bodies O in a state where the fingertips O1 and O2 come into contact with each other. FIGS. 8A and 9A show the detection threshold value It set on the display screen 11. In addition, FIGS. 8B and 9B show a case where the horizontal position designated on the display screen 11 is indicated by the X mark X1.

In a state where the fingertips O1 and O2 are separated from each other, as shown in FIG. 8B, the first fingertip O1 is disposed in the lower left region of the display screen 11, and the second fingertip O2 is disposed in the upper right region thereof. The operating body detection unit 12, as shown in FIG. 8A, detects reflected light having the detection threshold value It or more in regions corresponding to positions of the first and second fingertips and O2, and detects reflected light having the maximum intensity I1' in regions corresponding to central positions of the fingertips O1 and O2. Here, the maximum intensity I1' corresponds to intensity of reflected light from an operating body O disposed at the height h1+1 unit over the display screen 11. In addition, 1 unit indicates a distance corresponding to a vertical resolution of the sensors 42B. The position determination unit 31 calculates a position of the first fingertip O1 as (X, Y, Z)=(6, 14, h1+1), and calculates a position of the second fingertip O2 as (X, Y, Z)=(18, 6, h1'). The position determination unit 31 calculates a separation distance D1 between the first and second fingertips O1 and O2.

In a state where the fingertips O1 and O2 come into contact with each other, the first fingertip O1 is moved in the upper right direction, and the second fingertip O2 is moved in the lower left direction. The position determination unit 31 calculates a position of the first fingertip O1 as (X, Y, Z)=(10, 10, h1'), and calculates a position of the second fingertip O2 as (X, Y, Z)=(14, 10, h1'). The position determination unit 31 calculates a separation distance D2 between the first and second fingertips O1 and O2.

The operating body detection unit 12 updates detection results of the fingertips O1 and O2 in response to the movements of the fingertips O1 and O2, and the position determination unit 31 updates determination results of positions of the fingertips O1 and O2. In addition, in a state where the fingertips O1 and O2 come into contact with each other, the position determination unit 31 grasps that the fingertips O1 and O2 stop being moved, from situations of variations in the positions of the fingertips O1 and O2. Here, the position determination unit 31 grasps propensities of the movements of the fingertips O1 and O2 by continuously determining positions of the fingertips O1 and O2 according to the movements of the fingertips O1 and O2. Therefore, the position determination unit 31 can determine positions of the fingertips O1 and O2 with high accuracy in a state where the fingertips O1 and O2 come into contact with each other.

Figure 10:
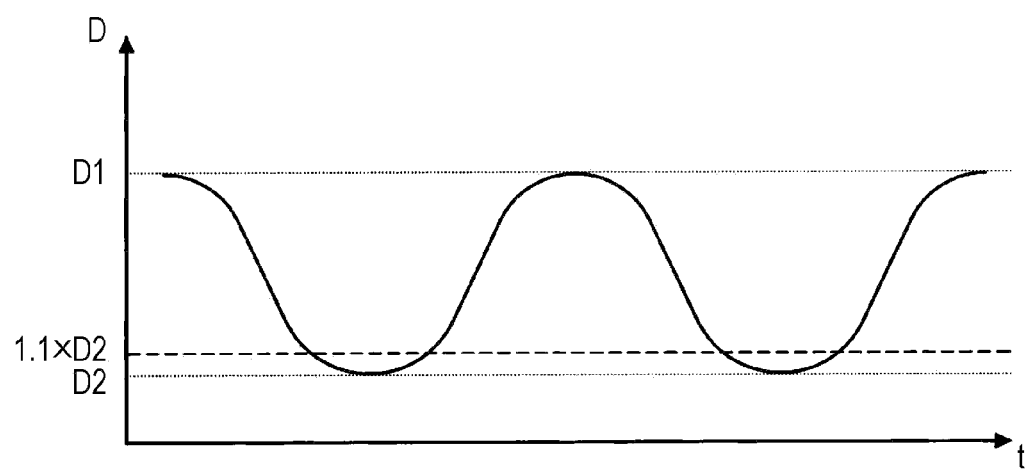
FIG. 10 is a diagram illustrating variations in a separation distance between the fingertips during an action where the fingertips come into contact with each other.

FIG. 10 shows variations in the separation distance D between the fingertips O1 and O2 during an action where the fingertips O1 and O2 come into contact with each other. The separation distance D between the fingertips O1 and O2 corresponds to a distance between a central part of the first fingertip O1 and a central part of the second fingertip O2. FIG. 10 shows time-series variations in the separation distance D between the fingertips O1 and O2 when actions where the fingertips O1 and O2 come into contact with each other in a state of being separated from each other and are separated from each other again in a state of coming into contact with each other are repeated.

The separation distance D is the minimum value D2 in a state where the fingertips O1 and O2 come into contact with each other. Therefore, the position determination unit 31 can determine, for example, a time point when a separation distance within a predetermined range from the minimum value D2 (for example, D2 to 1.1D2) is detected, as a time point where the fingertips O1 and O2 come into contact with each other, based on the variations in the separation distance D. In addition, the minimum value D2 is calculated for each action where the fingertips O1 and O2 come into contact with each other, and is preferably calculated as an average value obtained through the repeated actions. In addition, the separation distance D within the predetermined range from the minimum value D2 is not limited to the position determination of the operating body O but may be used for a determination of a state where the fingertips O1 and O2 come into contact with each other.

Figure 11:
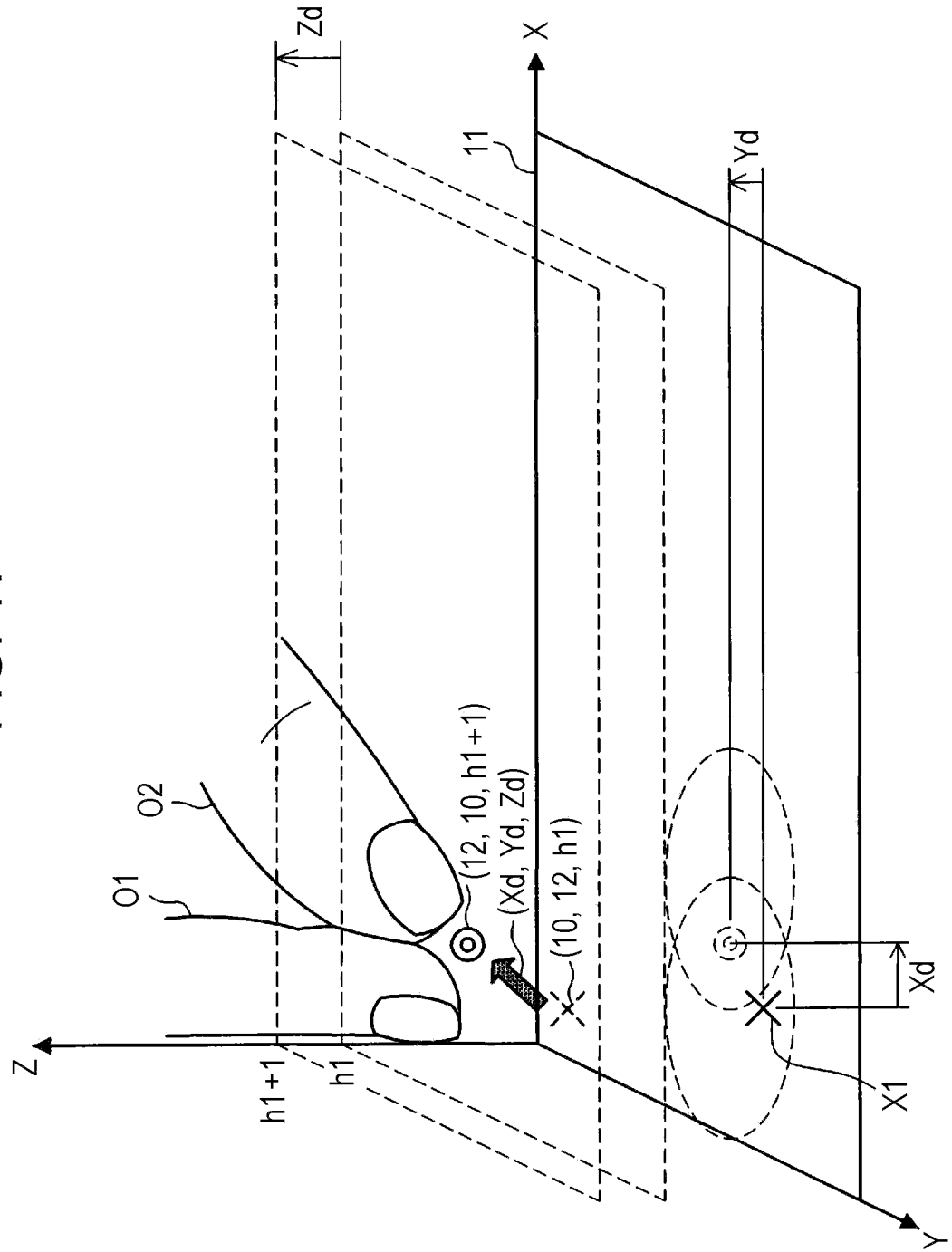
FIG. 11 is a diagram illustrating an example of the correction information obtained based on the action where the fingertips come into contact with each other.

FIG. 11 shows an example of the correction information obtained based on an action where the fingertips O1 and O2 come into contact with each other. In addition, the X axis and the Y axis in FIG. 11 are coordinates which express positions on the display screen 11 with the arrangement interval units of the sensors 42B, and an origin of the X axis and the Y axis is set to a predetermined position on the display screen 11. Further, the Z axis in FIG. 11 is a coordinate which expresses a position on the display screen 11 with the resolution units of the sensors 42B, and an origin of the Z axis is set to the surface of the display screen 11.

Here, it is assumed that a state where the fingertips O1 and O2 come into contact with each other has been determined in the state shown in FIG. 9B. At this time, as denoted with the double circles in FIG. 9B, the position determination unit 31 determines an intermediate position (X, Y)=(12, 10) between the horizontal position of the first fingertip O1 and the horizontal position of the second fingertip O2 as a horizontal position of the operating bodies O1 and O2 disposed according to the guide information G. In addition, the intermediate position is calculated for each action where the fingertips O1 and O2 come into contact with each other, and is preferably calculated as an average value obtained through the repeated actions.

Here, the determination result of the horizontal position is deviated by distances corresponding to two sensors to the upper side and the right side from the designated horizontal position (X, Y)=(10, 12). The errors occur because, for example, the sensitivity of the sensors 42B is not appropriately adjusted in the horizontal direction, and a position of the operation input is deviated according to the viewing direction of the user.

In addition, it is assumed that light intensities have been detected by the sensors 42B corresponding to the positions of the first and second fingertips O1 and O2 in a state where the fingertips O1 and O2 come into contact with each other, as shown in FIG. 9A. In this case, the position determination unit 31 determines a height (for example, the height h1+1 on the display screen 11) corresponding to an average value of the maximum intensities of reflected light detected so as to correspond to positions of the first and second fingertips O1 and O2, as vertical positions of the operating bodies O1 and O2 disposed according to the guide information G. In addition, the vertical positions of the operating bodies O1 and O2 are also determined in a state where the fingertips O1 and O2 are separated from each other without being limited to a state where the fingertips O1 and come into contact with each other, and are preferably calculated as an average value thereof. In addition, the intermediate position is calculated for each action where the fingertips O1 and O2 come into contact with each other, and is preferably calculated as an average value obtained through the repeated actions.

Here, the determination result of the vertical position is deviated by 1 unit to the upper side from the designated vertical position Z=h1. The errors occur because, for example, the sensitivity of the sensors 42B is not appropriately adjusted in the vertical direction, and a position of the operation input is deviated according to the viewing direction of the user.

In addition, the correction information generation unit 34, as shown in FIG. 11, generates correction information from the errors between the designated three-dimensional position and the determined three-dimensional position. Here, the correction information generation unit 34 calculates an error (Xd, Yd, Zd)=(+2, −2, +1) from the error between the designated position (X, Y, Z)=(10, 12, h1) and the result of the position determination (X, Y, Z)=(12, 10, h1+1). The obtained error indicates that the result of the position determination is deviated by distances corresponding to two sensors to the right and upper sides in the horizontal direction, and by 1 unit to the upper side in the vertical direction, from the designated position.

Therefore, the correction information generation unit 34 generates correction information (Xc, Yc, Zc)=(−2, +2, −1) so as to cancel out the error. The correction information indicates that the detection result of the operating body O is displaced by distances corresponding to two sensors to the left and lower sides in the horizontal direction and by 1 unit to the lower side in the vertical direction.

Figure 12:
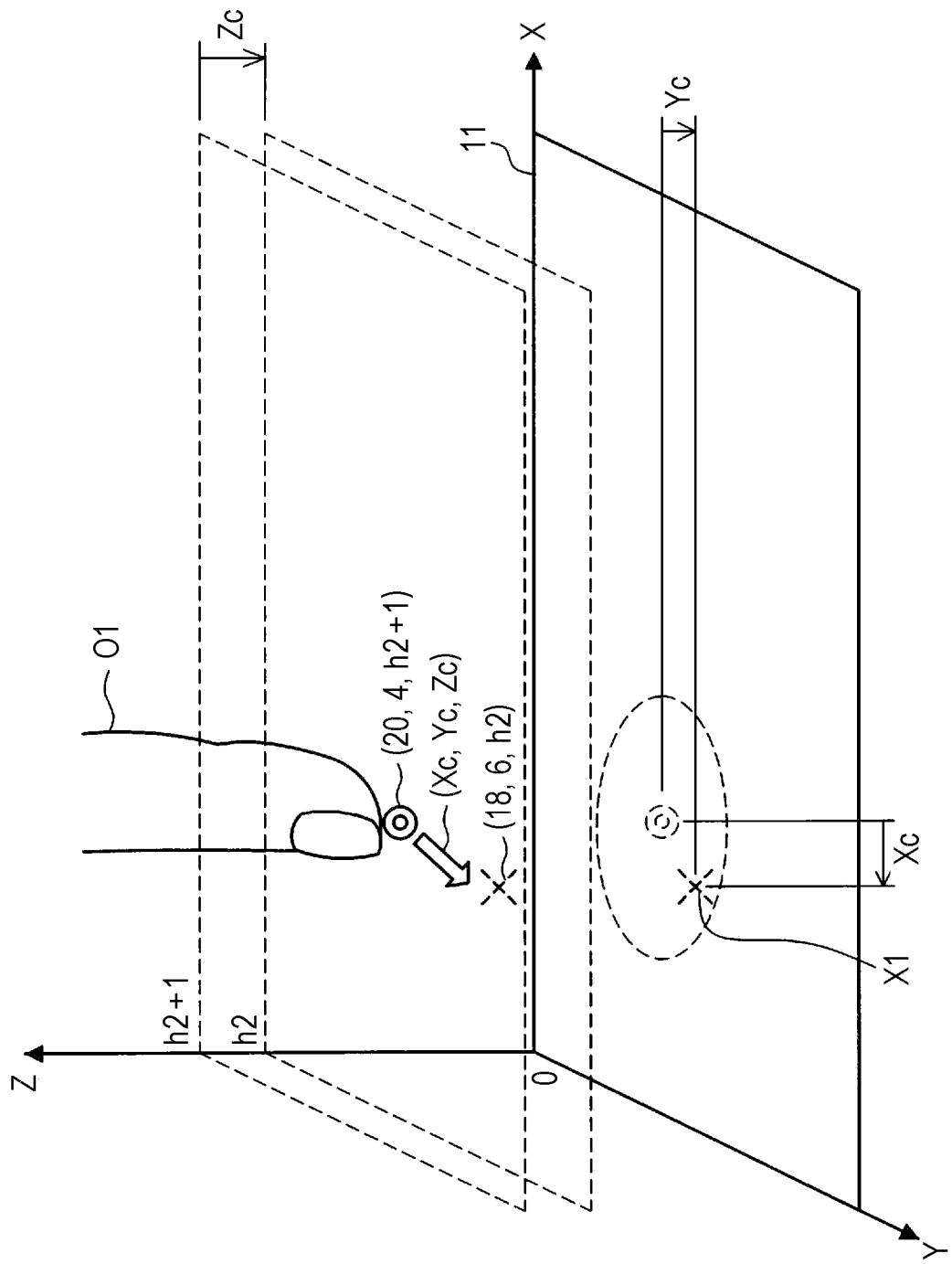
FIG. 12 is a diagram illustrating an example of the position correction of an operating body based on the correction information shown in FIG. 11.

FIG. 12 shows an example of the position correction of the operating body O based on the correction information shown in FIG. 11. In FIG. 12, the index finger O1 as the operating body O is disposed over the display screen 11 in the normal operation mode. The position determination unit 31 determines a three-dimensional position of the operating body as, for example, (X, Y, Z)=(20, 4, h2+1), based on the detection result of the operating body O, as shown in FIGS. 4A to 4C. Next, the position correction unit 35 corrects the three-dimensional position of the operating body O1 to (X, Y, Z)=(18, 6, h2) based on the above-described correction information (Xc, Yc, Zc)=(−2, +2, −1).

Figure 13B:
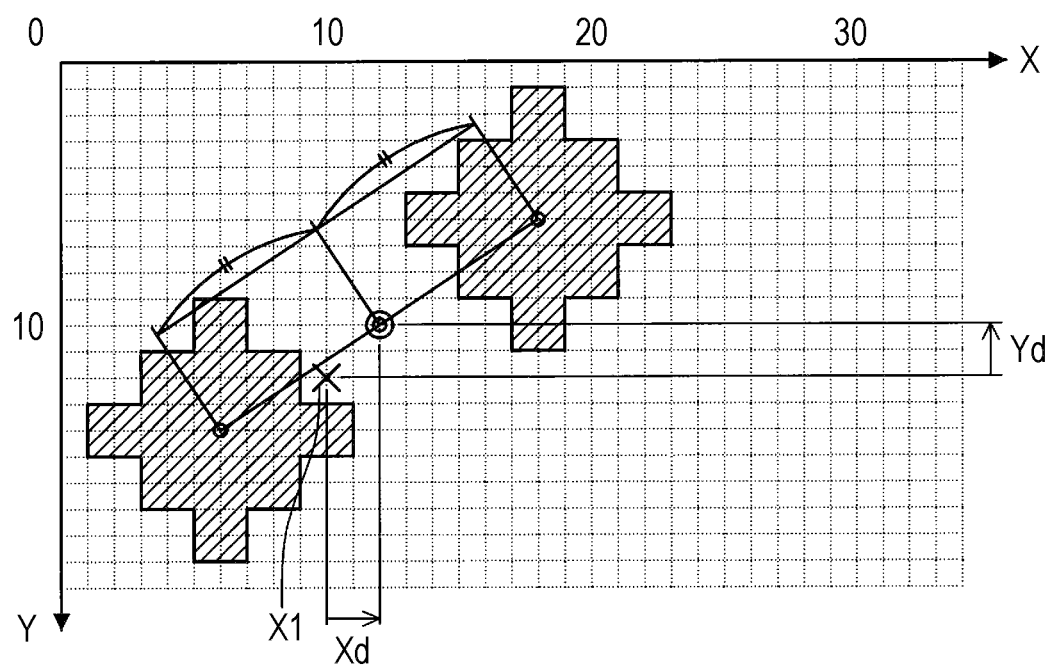
FIG. 13B is a diagram (2/2) illustrating an example of the correction information obtained based on an action when the fingertips are separated from each other.

FIGS. 13A and 13B show an example of correction information obtained based on an action where the fingertips O1 and O2 are separated from each other. FIG. 13A shows guide information G which requests the user to perform an action where fingertips O1 and O2 are separated from each other, and the action performed according to the guide information G. FIG. 13B shows correction information obtained based on the action shown in FIG. 13A.

As shown in FIG. 13A, the user disposes the fingertip O1 of the index finger (the first fingertip O1) and the fingertip O2 of the thumb (the second fingertip O2) at the height h1 over the display screen 11 according to the guide information G. In addition, the user moves the first and second fingertips O1 and O2 from a state of accurately bringing the fingertips into contact with each other over the X mark X1 in a state of maintaining the height, and then uniformly separates the fingertips from each other from the X mark X1. Here, a case where the horizontal position (X, Y)=(10, 12) on the display screen 11 is designated by the X mark X1 is assumed. In addition, a case where the first and second fingertips O1 and O2 are maintained at the vertical position Z=h1 is assumed. Further, in a case where the fingertips O1 and O2 are not maintained at the vertical position Z=h1, correction information for the vertical position is generated in the same manner as the case shown in FIG. 11.

The operating body detection unit 12 updates detection results of the fingertips O1 and O2 in response to the movements of the fingertips O1 and O2, and the position determination unit 31 updates determination results of positions of the fingertips O1 and O2. In addition, in a state where the fingertips O1 and O2 are separated from each other, the position determination unit 31 grasps that the fingertips O1 and O2 stop being moved, from situations of variations in the positions of the fingertips O1 and O2. Here, the position determination unit 31 grasps propensities of the movements of the fingertips O1 and O2 by continuously determining positions of the fingertips O1 and O2 according to the movements of the fingertips O1 and O2. Therefore, the position determination unit 31 can determine positions of the fingertips O1 and O2 with high accuracy in a state where the fingertips O1 and O2 are separated from each other.

As shown in FIG. 13B, first, the position determination unit 31 calculates a position of the first fingertip O1 as (X, Y, Z)=(6, 14, h1), and calculates a position of the second fingertip O2 as (X, Y, Z)=(18, 6, h1) in a state where fingertips O1 and O2 are separated from each other. Next, the position determination unit 31 determines an intermediate position (X, Y)=(12, 10) between the horizontal position of the first fingertip O1 and the horizontal position of the second fingertip O2 as a position of the operating bodies O disposed according to the guide information G.

In addition, the correction information generation unit 34 calculates an error (Xd, Yd, Zd)=(+2, −2, 0) from the error between the designated position (X, Y, Z)=(10, 12, h1) and the result of the position determination (X, Y, Z)=(12, 10, h1). The correction information generation unit 34 generates correction information (Xc, Yc, Zc)=(−2, +2, 0) so as to cancel out the error.

Figure 14B:
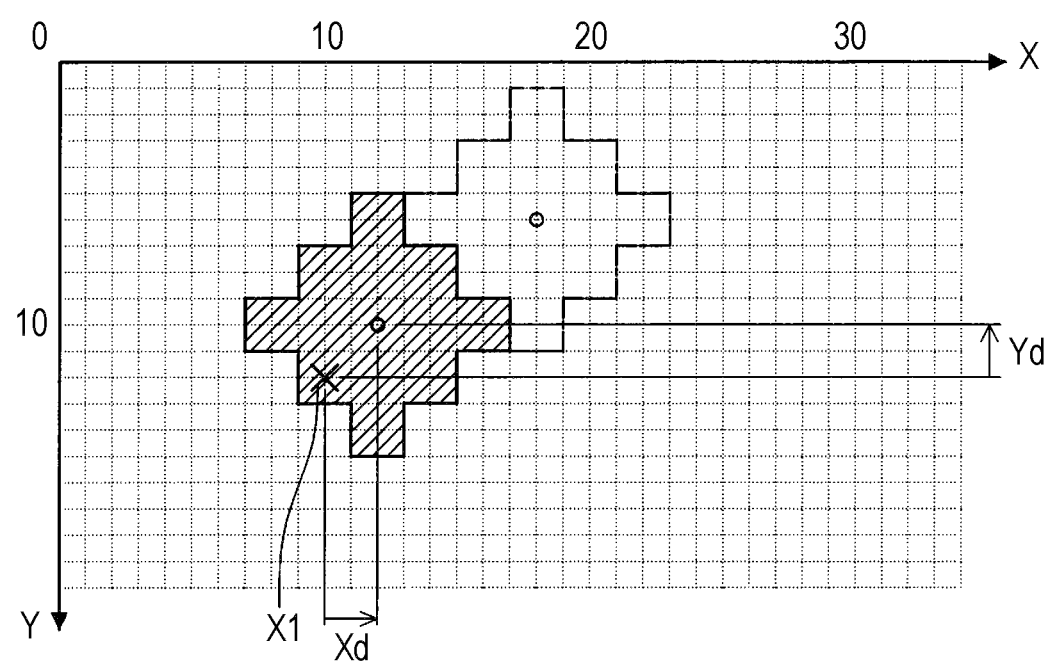
FIG. 14B is a diagram (2/2) illustrating an example of the correction information obtained based on a horizontal movement action and a stop action of an operating body.

FIGS. 14A and 14B show an example of correction information obtained based on the horizontal movement and stop action of the fingertip O1. FIG. 14A shows guide information G which requests the user to perform an action where the fingertip O1 is horizontally moved and then stopped, and the action performed according to the guide information G. FIG. 14B shows correction information obtained based on the action shown in FIG. 14A.

As shown in FIG. 14A, the user disposes the fingertip O1 of the index finger (first fingertip O1) at the height h1 over the display screen 11 according to the guide information G. In addition, the user horizontally moves the first fingertip O1 in a state of maintaining the height and then accurately stops the first fingertip O1 over the X mark X1. Here, a case where the horizontal position (X, Y)=(10, 12) on the display screen 11 is designated by the X mark X1 is assumed. In addition, a case where the first fingertip O1 is maintained at the vertical position Z=h1 is assumed. Further, in a case where the fingertip O1 is not maintained at the vertical position Z=h1, correction information for the vertical position is generated in the same manner as the case shown in FIG. 11.

The operating body detection unit 12 updates detection results of the fingertip O1 in response to the movements of the fingertip O1, and the position determination unit 31 updates determination results of a position of the fingertip O1. In addition, in a state where the fingertip O1 is stopped, the position determination unit 31 grasps that the fingertip O1 stops being moved, from situations of variations in the position of the fingertip O1. Here, the position determination unit 31 grasps a propensity of the movement of the fingertip O1 by continuously determining a position of the fingertip O1 according to the movement of the fingertip O1. Therefore, the position determination unit 31 can determine a position of the fingertip O1 with high accuracy in a state where the fingertip O1 is stopped.

As shown in FIG. 14B, first, the correction information generation unit 34 calculates a position of the first fingertip O1 as (X, Y, Z)=(12, 10, h1) in a state of stopping the fingertip O1 and determines it as a position of the operating body O1 disposed according to the guide information G. In addition, the correction information generation unit 34 calculates an error (Xd, Yd, Zd)=(+2, −2, 0) from the error between the designated position (X, Y, Z)=(10, 12, h1) and the result of the position determination (X, Y, Z)=(12, 10, h1). The correction information generation unit 34 generates correction information (Xc, Yc, Zc)=(−2, +2, 0) so as to cancel out the error.

Figure 15B:
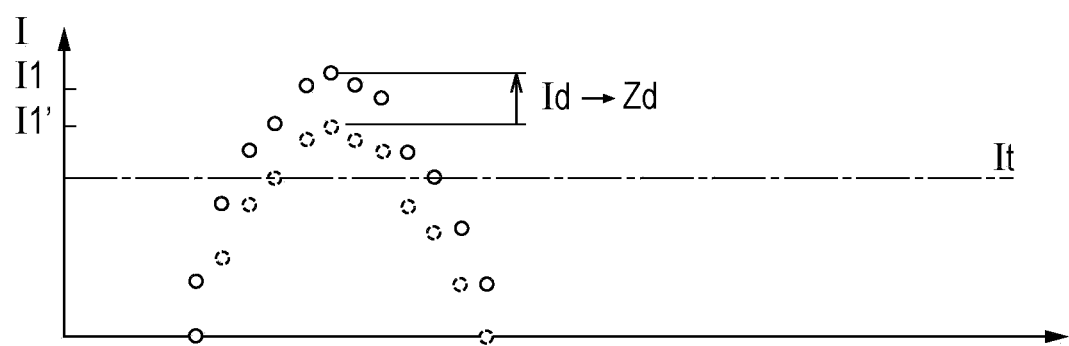
FIG. 15B is a diagram (2/2) illustrating an example of the correction information obtained based on a vertical movement action and a stop action of an operating body.

FIGS. 15A and 15B show an example of correction information obtained based on the vertical movement and stop action of the fingertip O1. FIG. 15A shows guide information G which requests the user to perform an action where the fingertip O1 is vertically moved and then stopped, and the action performed according to the guide information G. FIG. 15B shows correction information obtained based on the action shown in FIG. 15A.

As shown in FIG. 15A, first, for example, the user disposes the fingertip O1 of the index finger (the first fingertip O1) over X mark X1 according to the guide information G. In addition, the user vertically moves the first fingertip O1 in a state of maintaining the horizontal position and then accurately stops the first fingertip O1 at the height h1. Here, a case where the horizontal position (X, Y)=(10, 12) on the display screen 11 is designated by the X mark X1, and the first fingertip O1 is maintained at the horizontal position (X, Y)=(10, 12), is assumed. Further, in a case where the fingertip O1 is not maintained at the horizontal position (X, Y)=(10, 12), correction information for the horizontal position is generated in the same manner as the case shown in FIG. 11.

The operating body detection unit 12 updates detection results of the fingertip O1 in response to the movements of the fingertip O1, and the position determination unit 31 updates determination results of a position of the fingertip O1. In addition, in a state where the fingertip O1 is stopped, the position determination unit 31 grasps that the fingertip O1 stops being moved, from situations of variations in the position of the fingertip O1. Here, the position determination unit 31 grasps a propensity of the movement of the fingertip O1 by continuously determining a position of the fingertip O1 according to the movement of the fingertip O1. Therefore, the position determination unit 31 can determine a position of the fingertip O1 with high accuracy in a state where the fingertip O1 is stopped.

First, the correction information generation unit 34 calculates a position of the first fingertip O1 as (X, Y, Z)=(10, 12, h1+1) from the maximum intensity I1' of the sensors 42B in a state of stopping the fingertip O1, and determines it as a position of the operating body O1 disposed according to the guide information G. In addition, the correction information generation unit 34 calculates an error (Xd, Yd, Zd)=(0, 0, +1) from the error between the designated position (X, Y, Z)=(10, 12, h1) and the result of the position determination (X, Y, Z)=(10, 12, h1+1). The correction information generation unit 34 generates correction information (Xc, Yc, Zc)=(0, 0, −1) so as to cancel out the error.

In addition, the result of the position determination is not limited to a position determination of the operating body O, but may be used to set a height at which the center of the fingertip O1 is typically disposed, or the upper limit and/or the lower limit of the height at which the center of the fingertip O1 is typically disposed, during user operation.

Figure 16B:
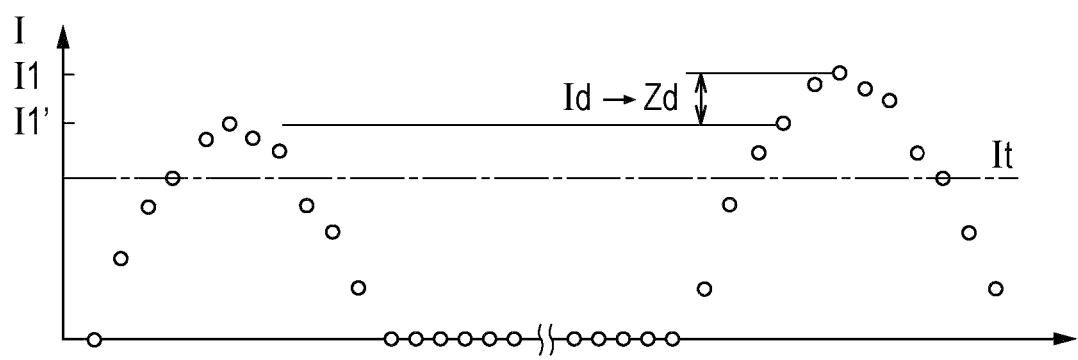
FIG. 16B is a diagram (2/2) illustrating an example of the correction information obtained based on an action where an operating body is vertically moved and stopped at a plurality of positions on the display screen.

FIGS. 16A and 16B show an example of correction information obtained based on an action where the operating body O is vertically moved and then stopped at a plurality of positions on the display screen 11. FIG. 16A shows guide information G which requests the user to perform an action where the fingertip O1 is vertically moved and then stopped at a plurality of positions on the display screen 11, and the action performed according to the guide information G. FIG. 16B shows correction information obtained based on the action shown in FIG. 16A.

As shown in FIG. 16A, the region on the display screen 11 is divided into, for example, two regions of the left part and the right part. First, for example, the user vertically moves the fingertip O1 of the index finger (first fingertip O1) over the X mark X1 in the first region and then accurately stops the fingertip O1 at the height h1 according to the guide information G. Next, the user vertically moves the first fingertip O1 over the X mark X2 in the second region and then accurately stops the fingertip O1 at the height h1. Here, a case where the horizontal positions (X, Y)=(6, 10) and (X, Y)=(26, 10) on the display screen 11 are respectively designated by the X mark X1 and the X mark X2 in the first and second regions, and the first fingertip O1 is maintained at the horizontal positions (X, Y)=(6, 10) and (X, Y)=(26, 10), is assumed.

As shown in FIG. 16B, the sensors 42B detect reflected light having the detection threshold value It or more in a region corresponding to a position of the first fingertip O1, and detect reflected light having the maximum intensity I1' in a region corresponding to a position of the central part of the fingertip O1. First, the position determination unit 31 calculates the position of the first fingertip O1 as (X, Y, Z)=(6, 10, h1+1) in the first region, and calculates the position of the first fingertip O1 as (X, Y, Z)=(26, 10, h1) in the second region.

In addition, for example, in relation to the first region, the correction information generation unit 34 calculates an error (Xd, Yd, Zd)=(0, 0, +1) from the error between the result of the position determination (X, Y, Z)=(6, 10, h1+1) and the designated position (X, Y, Z)=(6, 10, h1) in the first region. The correction information generation unit 34 generates correction information (Xc, Yc, Zc)=(0, 0, −1) so as to cancel out the error. Thereby, it is determined that the sensitivity of the sensors 42B is low in the first region, and thus the vertical position of the operating body O detected over the first region is corrected according to the correction information.

On the other hand, for example, in relation to the second region, since the result of the position determination (X, Y, Z)=(26, 10, h1) corresponds with the designated position (X, Y, Z)=(26, 10, h1), the correction information generation unit 34 calculates an error (Xd, Yd, Zd)=(0, 0, 0) in the second region. The correction information generation unit 34 generates correction information as (Xc, Yc, Zc)=(0, 0, 0) in the second region. Thereby, it is determined that the sensitivity of the sensors 42B is appropriately adjusted in the second region, and thus the vertical position of the operating body O detected over the second region is not corrected.

Although a case where the display screen 11 is divided into two regions of the left part and the right part has been described with reference to FIGS. 16A and 16B, the display screen 11 may be divided into three or more regions of the left part and the right part, and/or two regions of the upper part and the lower part. In this case, correction information is generated and stored for each region, and thus a vertical position of the operating body O can be corrected according to the correction information in relation to a region where the operating body O is detected.

3. Conclusion

As described above, in the display device and the position correction method according to the embodiment of the present disclosure, an operating body O disposed over the display screen 11 is detected via the display screen 11, and a three-dimensional position of the operating body O is determined from the detection result and is output as position information for the operating body O. In addition, a three-dimensional position over the display screen 11 is designated, and guide information G, which requests a user to perform an action for the operating body O around the designated three-dimensional position and to dispose the operating body O at the designated three-dimensional position, is generated so as to be displayed on the display screen 11. In addition, correction information is generated from an error between the designated three-dimensional position and a determination result of the three-dimensional position of the operating body O disposed according to the guide information G, and the three-dimensional position of the operating body O is corrected based on the correction information. Thereby, it is possible to easily correct the three-dimensional position of the operating body O detected over the display screen 11.

As such, although the preferred embodiment of the present disclosure has been described with reference to the accompanying drawings, the present disclosure is not limited to the embodiment. It is obvious that a person skilled in the art can conceive of a variety of modifications or alterations within the scope of the technical spirit disclosed in the claims, and it is understood that they naturally belong to the technical scope of the present disclosure.

For example, in the above description, a case where a position of the operating body O is specified as values of the integral multiple of the arrangement interval of the sensors 42B has been described. However, a plurality of sensors 42B detecting reflected light having the detection threshold value It or more from the operating body O may be used as a central position, and a position of the operating body O may be specified as values of the multiples of real numbers of the arrangement interval of the sensors 42B. In this case, correction information is also generated as values of the multiples of real numbers of the arrangement interval of the sensors 42B.

In addition, although a case where the index finger O1 and the thumb O2, or the index finger O1 is used as an example of the operating body O has been described in the above description, other fingers may be used. In addition, instead of the fingers, a pointing device such as a stylus may be used.

In addition, although, in the above description, a case where guide information G is displayed on the display screen 11 has been described, a notification of information other than marks designating a horizontal position among a plurality of pieces of guide information G may be sent to a user as sound information.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a display control part configured to control a display to display guide information; and
a position determination part configured to determine three-dimensional position information of an operating body based on both a three-dimensional position of the operating body detected by a detection part of the information processing apparatus and a predetermined position corresponding to the guide information,
wherein the determined three-dimensional position includes a relative vertical distance between the detection part and the operating body, and wherein the detection part is configured to control a detection of the operating body disposed over the display.

2. The information processing apparatus according to claim 1, wherein the guide information comprises a prompt of predetermined action for the operating body.

3. The information processing apparatus according to claim 2, wherein the predetermined action is an action where the operating body is horizontally moved in a state where the operating body is maintained at a designated vertical position, and then is stopped at a designated horizontal position.

4. The information processing apparatus according to claim 2, wherein the predetermined action is an action where the operating body is vertically moved in a state where the operating body is maintained at a designated horizontal position, and then is stopped at a designated vertical position.

5. The information processing apparatus according to claim 2, wherein the predetermined action is an action where two fingertips come into contact with each other at designated horizontal positions from a state where the fingertips are separated from each other in a state where the two fingertips are maintained at designated vertical positions.

6. The information processing apparatus according to claim 2, wherein the predetermined action is an action where two fingertips are separated from each other with respect to designated horizontal positions from a state where the fingertips come into contact with each other in a state where the two fingertips are maintained at designated vertical positions.

7. An information processing apparatus comprising:
a display control part configured to control a display to display guide information comprising a prompt of a predetermined action to move an operating body, while fixing at least one variable associated with a position of the operating body disposed over a predetermined position displayed on the display; and
a position determination part configured to determine position information of the operating body based on both the position of the operating body detected by a detection part of the information processing apparatus and a predetermined position corresponding to the guide information, wherein the detection part is configured to control a detection of the operating body disposed over the display.

8. The information processing apparatus according to claim 7, wherein the position information of the operating body is three-dimensional position information and the detected position is a three-dimensional position.

9. The information processing apparatus according to claim 7, wherein the operating body is a finger.

10. The information processing apparatus according to claim 7, wherein the operating body is a stylus.

11. An information processing method comprising:
controlling a display to display guide information;
controlling detection of the operating body disposed over the display; and
determining three-dimensional position information of an operating body based on both a detected three-dimensional position of the operating body and a predetermined position corresponding to the guide information, wherein the determined three-dimensional position includes a relative vertical distance between the detection part and the operating body.

12. An information processing method comprising:
controlling a display to display guide information comprising a prompt of a predetermined action to move an operating body, while fixing at least one variable associated with a position of the operating body disposed over a predetermined position displayed on the display;
controlling detection of the operating body disposed over the display; and
determining position information of the operating body based on both a detected position of the operating body and a predetermined position corresponding to the display guide information.

13. The information processing method according to claim 12, wherein the position information of the operating body is three-dimensional position information and the detected position is a three-dimensional position.

14. The information processing apparatus according to claim 1, wherein the detection part is integrated with the display of the information processing apparatus.

15. The information processing apparatus according to claim 1, wherein the relative vertical distance is based on a maximum intensity of reflected light from the operating body detected by the detection part.

* * * * *